United States Patent
Freire

(10) Patent No.: US 9,881,103 B2
(45) Date of Patent: *Jan. 30, 2018

(54) METHOD AND SYSTEM FOR QUERY TRANSFORMATION FOR MANAGING INFORMATION FROM MULTIPLE DATASETS

(71) Applicant: First American Financial Corporation, Santa Ana, CA (US)

(72) Inventor: Adriano Freire, St. Louis Park, MN (US)

(73) Assignee: First American Financial Corporation, Santa Ana, CA (US)

(*) Notice: Subject to any disclaimer, the term of this patent is extended or adjusted under 35 U.S.C. 154(b) by 233 days.

This patent is subject to a terminal disclaimer.

(21) Appl. No.: 14/171,712

(22) Filed: Feb. 3, 2014

(65) Prior Publication Data

US 2014/0214809 A1    Jul. 31, 2014

Related U.S. Application Data

(63) Continuation of application No. 11/231,345, filed on Sep. 19, 2005, now Pat. No. 8,694,532.

(60) Provisional application No. 60/610,790, filed on Sep. 17, 2004.

(51) Int. Cl.
   *G06F 17/30* (2006.01)

(52) U.S. Cl.
   CPC .. *G06F 17/30979* (2013.01); *G06F 17/30557* (2013.01)

(58) Field of Classification Search
   CPC ............ G06F 17/30979; G06F 17/30557
   USPC ........................................... 707/722
   See application file for complete search history.

(56) References Cited

U.S. PATENT DOCUMENTS

| | | | | |
|---|---|---|---|---|
| 5,600,833 A | * | 2/1997 | Senn | G06F 17/3066 |
| 5,832,504 A | * | 11/1998 | Tripathi | G06F 17/218 |
| | | | | 707/E17.005 |
| 6,134,544 A | * | 10/2000 | Glitho | H04L 41/18 |
| | | | | 455/422.1 |
| 6,226,649 B1 | * | 5/2001 | Bodamer | G06F 17/30427 |
| | | | | 707/722 |
| 6,236,997 B1 | * | 5/2001 | Bodamer | G06F 17/30569 |
| 6,609,123 B1 | * | 8/2003 | Cazemier | G06F 17/30607 |
| 6,611,838 B1 | * | 8/2003 | Ignat | G06F 17/30563 |
| 6,704,726 B1 | * | 3/2004 | Amouroux | G06F 17/30433 |

(Continued)

OTHER PUBLICATIONS

Adams et al., "Semantic Integration of Heterogeneous Information Sources Using a Knowledge-Based System", In Proceedings of the 5th International Conference on Computer Science and Informatics (CS&I' 2000), 6 pages, 2000.*

(Continued)

*Primary Examiner* — Phuong Thao Cao
(74) *Attorney, Agent, or Firm* — Sheppard Mullin; Daniel Yannuzzi; Jonathan Marina

(57) ABSTRACT

A method and system for users to connect, extract, query and transform data from multiple databases, independent of their format, type, and location. The system comprises a setup portion, a meta database, and a user portion. The setup portion establishes datasets for use by the system with the user portion. The meta database stores the datasets. The user portion allows a user to input a query and processes the query to gather information from at least one data source and generate a response.

21 Claims, 26 Drawing Sheets

(56) References Cited

U.S. PATENT DOCUMENTS

| | | | |
|---|---|---|---|
| 6,725,268 B1* | 4/2004 | Jackel | H04L 43/0817 709/225 |
| 7,058,626 B1* | 6/2006 | Pan | G06F 17/30669 |
| 7,103,593 B2* | 9/2006 | Dean | G06F 17/30545 707/756 |
| 7,272,836 B1* | 9/2007 | Taylor | G06F 9/465 719/328 |
| 7,275,087 B2* | 9/2007 | Vaschillo | G06F 17/30896 707/E17.118 |
| 7,668,798 B2* | 2/2010 | Scanlon | G06F 17/30604 707/713 |
| 7,680,797 B1* | 3/2010 | Singh | G06F 17/3048 707/781 |
| 7,962,464 B1* | 6/2011 | Brette | G06F 17/30566 707/706 |
| 8,082,322 B1* | 12/2011 | Pascarella | G06F 9/541 707/759 |
| 8,626,716 B1* | 1/2014 | Katzer | G06F 17/30575 707/640 |
| 8,868,553 B2* | 10/2014 | Henderson | G06F 17/30893 707/610 |
| 2002/0032612 A1* | 3/2002 | Williams | G06Q 10/08 705/26.1 |
| 2002/0133504 A1* | 9/2002 | Vlahos | G06F 17/30566 |
| 2002/0152210 A1* | 10/2002 | Johnson | H04L 47/10 |
| 2002/0161757 A1* | 10/2002 | Mock | G06F 17/30241 |
| 2002/0161802 A1* | 10/2002 | Gabrick | G06F 17/30905 715/236 |
| 2003/0065663 A1* | 4/2003 | Chu | G06Q 10/10 |
| 2003/0107592 A1* | 6/2003 | Li | G06F 17/30787 715/745 |
| 2003/0131017 A1* | 7/2003 | Babb | G06F 17/30569 |
| 2003/0153362 A1* | 8/2003 | Goldsmith | H04B 7/18571 455/566 |
| 2003/0177111 A1* | 9/2003 | Egendorf | G06F 17/30864 |
| 2003/0200218 A1* | 10/2003 | Tijare | G06F 17/30917 |
| 2003/0233401 A1* | 12/2003 | Dean | G06F 17/30545 709/202 |
| 2003/0236859 A1* | 12/2003 | Vaschillo | G06F 17/30896 709/218 |
| 2004/0034651 A1* | 2/2004 | Gupta | G06F 17/30932 |
| 2004/0049495 A1* | 3/2004 | Lee | G06F 17/30932 |
| 2004/0093333 A1* | 5/2004 | Suzuki | G06F 17/30401 |
| 2004/0128276 A1* | 7/2004 | Scanlon | G06F 17/30604 |
| 2004/0148375 A1* | 7/2004 | Levett | G06F 9/46 709/223 |
| 2004/0181513 A1* | 9/2004 | Henderson | G06F 17/30893 |
| 2004/0186826 A1* | 9/2004 | Choi | G06F 17/3043 |
| 2005/0027674 A1* | 2/2005 | Potter | G06F 17/30392 |
| 2005/0043940 A1* | 2/2005 | Elder | G06F 17/3043 704/9 |
| 2005/0050068 A1* | 3/2005 | Vaschillo | G06F 17/30569 |
| 2005/0138057 A1* | 6/2005 | Bender | G06F 9/4443 |
| 2005/0149496 A1* | 7/2005 | Mukherjee | G06F 17/30528 |
| 2005/0149552 A1* | 7/2005 | Chan | G06F 17/30292 |
| 2005/0165754 A1* | 7/2005 | Valliappan | G06F 17/30557 |
| 2005/0228803 A1* | 10/2005 | Farmer | G06Q 10/10 |
| 2005/0234873 A1* | 10/2005 | Milligan | H04L 67/16 |
| 2006/0059137 A1* | 3/2006 | Walker | G06F 17/30979 |
| 2006/0080313 A1* | 4/2006 | Freire | G06F 17/30557 |
| 2006/0248058 A1* | 11/2006 | Feng | G06F 17/30569 |

OTHER PUBLICATIONS

Levy et al., "Querying Heterogeneous Information Sources Using Source Descriptions", In Proceedings of the 22nd VLDB Conference, Mumbai (Bombay), India, 1996, pp. 251-262.*

* cited by examiner

Dataset Properties ─╱─90

| | |
|---|---|
| Id | - unique ID; |
| Columns | - Column Properties ─╱─92 |
| | - Dataset Column Object Collection; ─╱─94 |
| Connectors | - Dataset Connector Properties ─╱ |
| | - Dataset Connectors Object Collection (Link tables); |
| Type | - DatasetType; |
| | { |
| |     'Sql Query', |
| |     'Sql Stored Procedure', |
| |     'WebService', |
| |     'Special Adapter' |
| | }; |
| BackupId | - Backup Dataset unique ID; |
| ParentId | - Object (Points to the Parent Object); |
| Sample | - (TOP) Number of records to retrieve; |
| URL | - WebService URL or StoredProcedure Name; |
| Filters | - Pos Execution Filters; |
| Distinct | - Flags if the returned data should be Distinct; |
| Errors | - Parsing, Execution Errors Bucket; |
| PageSize | - Returned Page Size in records; |
| PageNum | - Page number to return; |
| Timeout | - Execution Timeout parameter; |

FIG. 8A

Column Properties — 92

| | |
|---|---|
| Id | - unique ID; |
| Catalog | - Database catalog; |
| Schema | - Database schema; |
| Table | - Database table; |
| Default | - Default value for column or SP parameter; |
| Datatype | - Data type; |
| Length | - Column Size; |
| Scale | - Decimal Places when number; |
| Description | - Column Description; |
| Alias | - Alias; |
| ParentId | - Points to the Parent object; |
| NoSelect | - Flag, If set don't select his column in the Query; |
| InQuery | - Flag, This column is set to be in the Query; |
| ColumnType | - Column or Parameter (sp and Web Services); |
| SortOrder | - If sorted, how (ascending/descending); |

FIG. 8B

XML Request(1.1.1):

```xml
<Dataset>
        <Parameters>
                <Name>Name</Name>
                <Value>Stearns.ACS.Parcel.Subject.Search</Value>
        </Parameters>
        <Parameters>
                <Name>Sample</Name>
                <Value>2000</Value>
        </Parameters>
        <Parameters>
                <Name>Distinct</Name>
                <Value>True</Value>
        </Parameters>
        <Parameters>
                <Name>pagesize</Name>
                <Value>0</value>
        </Parameters>
        <Parameters>
                <Name>pagenum</Name>
                <Value>1</Value>
        </Parameters>
        <DataFields>
                <fieldname>ParcelNumber</fieldname>
        </DataFields>
        <DataFields>
                <fieldname>PrimaryOwner</fieldname>
        </DataFields>
        <DataFields>
                <fieldname>ParcelNumberNoDots</fieldname>
                <value>0503050000</value>
                <operator>like</operator>
                <sort>asc</sort>
        </DataFields>
        <DataFields>
                <fieldname>ROLLTYPE</fieldname>
                <value>R</value>
        </DataFields>
        <DataFields>
                <fieldname>TAXYEAR</fieldname>
                <value>2004</value>
        </DataFields>
        <DataFields>
                <fieldname>LegalDescription</fieldname>
        </DataFields>
</DataSet>
```

FIG. 20

XML Response (1.1.2)

```
<ParcelNumber>05.03050.00</ParcelNumber>
<ParcelNumberNoDots>0503050000</ParcelNumberNoDots>
<PropertyAddress>14026    RD{1t}br /{gt}COLD SPRING, MN
    56320</PropertyAddress>
<SortPropertyAddress>00014026HOLLYHOCKRDCOLD
    SPRING56320</SortPropertyAddress>
<PrimaryOwner>DENNIS   &DIANE    'PrimaryOwner>
<LegalDescription>Sect - 36 Twp - 124 Range - 030 32.44 AC 32.44 A. THAT PT OF
NE4NW4 LYING N OF CL OF TWP RD LESS & EXCEPT THAT PT DAF: COMM AT NE COR
OF NE4NW4 - S ALG E LN OF NE4NW4 745.40' TO POB - S ALG CL OF TWP RD
264.93' - SW'LY ALG CL 173.15' - S84D W 340.26' - S75D W 137.56' - N
213.52' - N36D E 314.04' - S89D E 402.31' TO POB</LegalDescrition>
<Taxyear>2004</Taxyear>
<RollType>R</RollType>>
```

FIG. 22

METHOD AND SYSTEM FOR QUERY TRANSFORMATION FOR MANAGING INFORMATION FROM MULTIPLE DATASETS

CROSS-REFERENCE TO RELATED APPLICATIONS

This application is a continuation of and claims the benefit of U.S. patent application Ser. No. 11/231,345 filed on Sep. 19, 2005, which issued as U.S. Pat. No. 8,694,532 on Apr. 8, 2014, which claims priority from U.S. Provisional Patent Application No. 60/610,790 filed on Sep. 17, 2004, both of which are incorporated herein by reference in their entirety.

TECHNICAL FIELD

This invention relates generally to a system and method for managing data. More specifically, the invention relates to a method and system for users to connect, extract, query and transform data from multiple databases, independent of their format, type and location as well as to write data to multiple databases, independent of their format, type and location.

BRIEF SUMMARY OF THE DISCLOSURE

A system and method for managing data. The system and method may be used to manage data to and/or from multiple data sources, independent of their format, type, and location. Managing data may comprise, for example, connecting, extracting, querying, transforming, interpreting, and writing data. The system comprises a setup portion, a meta database, and a user portion. The setup portion comprises a configuration tool and obtains collected metadata of the underlying data sources and develops datasets for use with the user portion. A meta database is provided to which the datasets developed by the setup portion are saved. The user portion uses the datasets in the meta database as a foundation for managing data in accordance with a user request. The user portion comprises a communication system and a data processing component. The data processing component comprises at least one adapter for managing data to and/or from at least one data source.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 8a illustrates example dataset properties in accordance with one embodiment.

FIG. 8b illustrates example column properties in accordance with one embodiment.

FIG. 20 illustrates an XML request of FIG. 19 in accordance with one embodiment.

FIG. 22 illustrates an XML response of FIG. 22 in accordance with one embodiment.

DETAILED DESCRIPTION

A system and method for managing data is provided. More specifically, a system and method that may be used to manage data to and/or from multiple data sources, independent of their format, type, and location. Managing data may comprise, for example, connecting, extracting, querying, transforming, interpreting, and writing data. As will be discussed more fully below, the system comprises a setup portion and a user portion. The setup portion establishes datasets for use with the user portion. The user portion manages data from and/or to at least one system or data source.

Figure 1A:
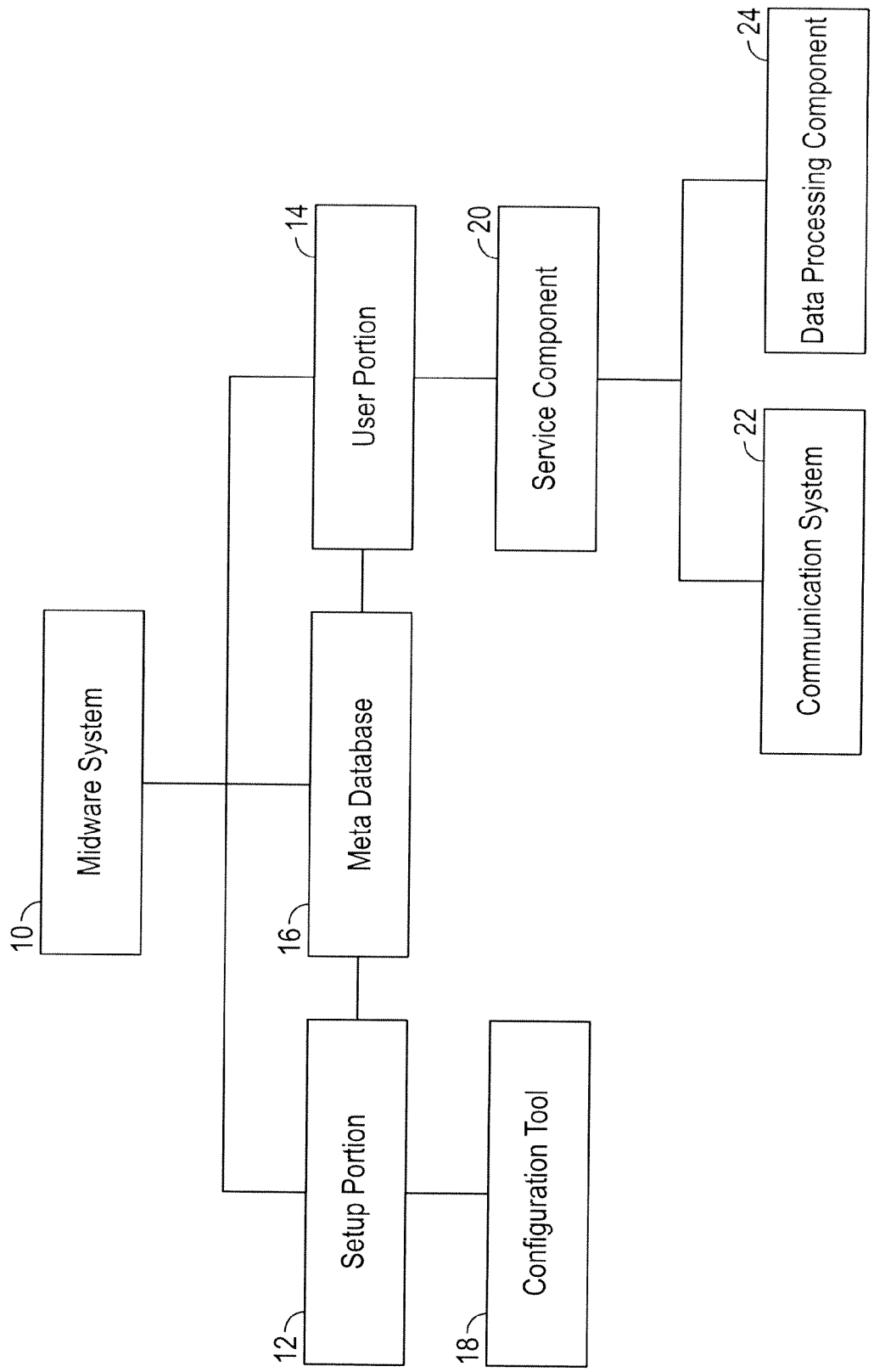
FIG. 1a illustrates a block diagram of the midware system in accordance with one embodiment.

FIG. 1a illustrates a block diagram of the midware system 10. The midware system 10 comprises a setup portion 12, a user portion 14, and a meta database 16. The setup portion 12 comprises a configuration tool 18 that is used to generate a dataset for storage in the meta database 16. The dataset acts as a foundation to the user portion 14. The user portion 14 comprises a service component 20 that in turn comprises a communication system 22 and a data processing component 24.

Using the setup portion 12, the midware system 10 may be particularly configured according to user requirements. Thus, for example, if the midware system 10 is to be used to manage information related to real estate, the setup portion 12 develops a dataset related to real estate information. The setup portion 12 recites the categories of that real estate information. Thus, the setup portion 12 establishes a dataset including fields for each type of information to be queried such as owner name, address, plat, etc. The dataset developed by the setup portion 12 is then integrated into and acts as a foundation for the user portion 14 of the midware system 10. The developed dataset is stored in a meta database 16.

Figure 1B:
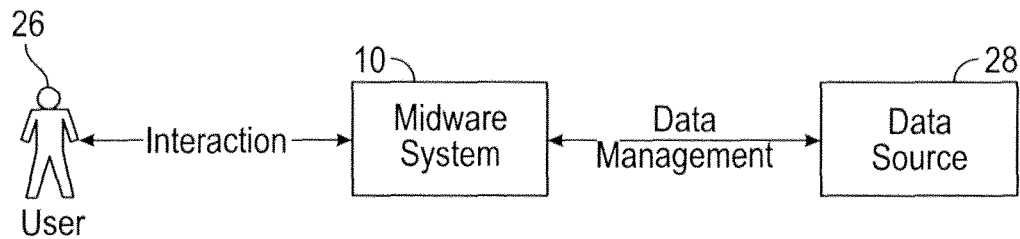
FIG. 1b illustrates a block diagram of the overarching interactions of a midware system with users and data sources in accordance with one embodiment.
Figure 2:
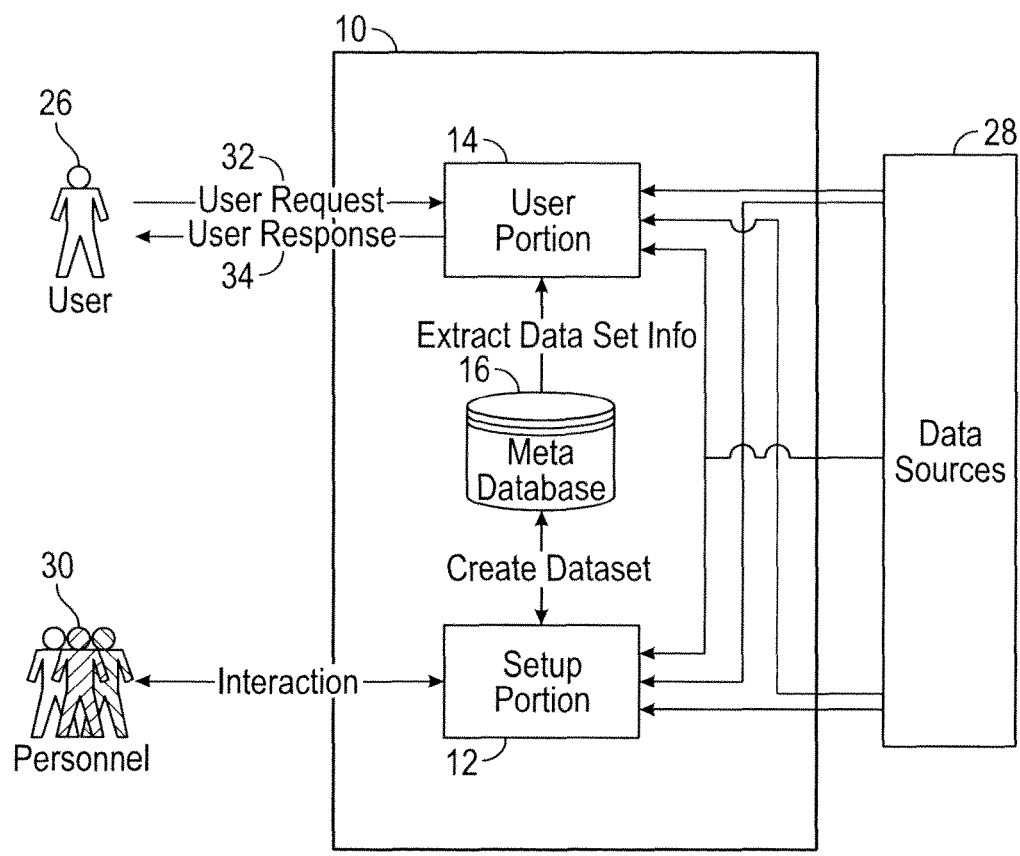
FIG. 2 illustrates a more detailed diagram of the interactions of a midware system with users and data sources in accordance with one embodiment.

As shown in FIG. 1b, a user 26 submits a request to the midware system 10 and the midware system 10 manages data with or to at least one data source 28 in accordance with the user request. As shown in FIG. 2, the user 26 may submit the user request using the user portion 14 of the midware system 10. This may be done by submitting a request such as an XML request. Alternatively, any suitable manner of submitting a request may be used. In one embodiment, the user uses a personal computer to request the information. The request is processed by the user portion 14 of the midware system 10. The midware system 10 manages the requested data with an at least one data source 28. For example, the midware system 10 may extract data from or write data to the at least one data source 28. In the case of data extraction, the extracted data is formatted as a report and transmitted to the user 26. The report may be designed for viewing on a screen of the personal computer used by the user.

Thus, the user portion 14 includes a service component 20 that manages data with at least one data source 28 based on the gathered description (meta) of the data developed as a dataset by the setup portion 12.

Generally, the midware system 10 gathers data across (or writes data to) several disparate data sources 28 such as systems and databases and consolidates the results in a user-friendly comprehensive view. Each of the data sources 28 may communicate in a different language and, as will be described more fully below, the midware system 10 need not know in what language the data source 28 communicates in order to manage data with the data source 28. Thus, the midware system 10 may provide a data abstraction layer to other applications. A user 26 in another application can use the midware system 10 to collect data in a language foreign to the application or can write to another system without knowing the language of that system.

FIG. 2 illustrates a more detailed view of the interactions shown in FIG. 1b. Diagrammatically, the setup phase is represented at the bottom of FIG. 2 while the user phase is represented at the top of FIG. 2.

Figure 24:
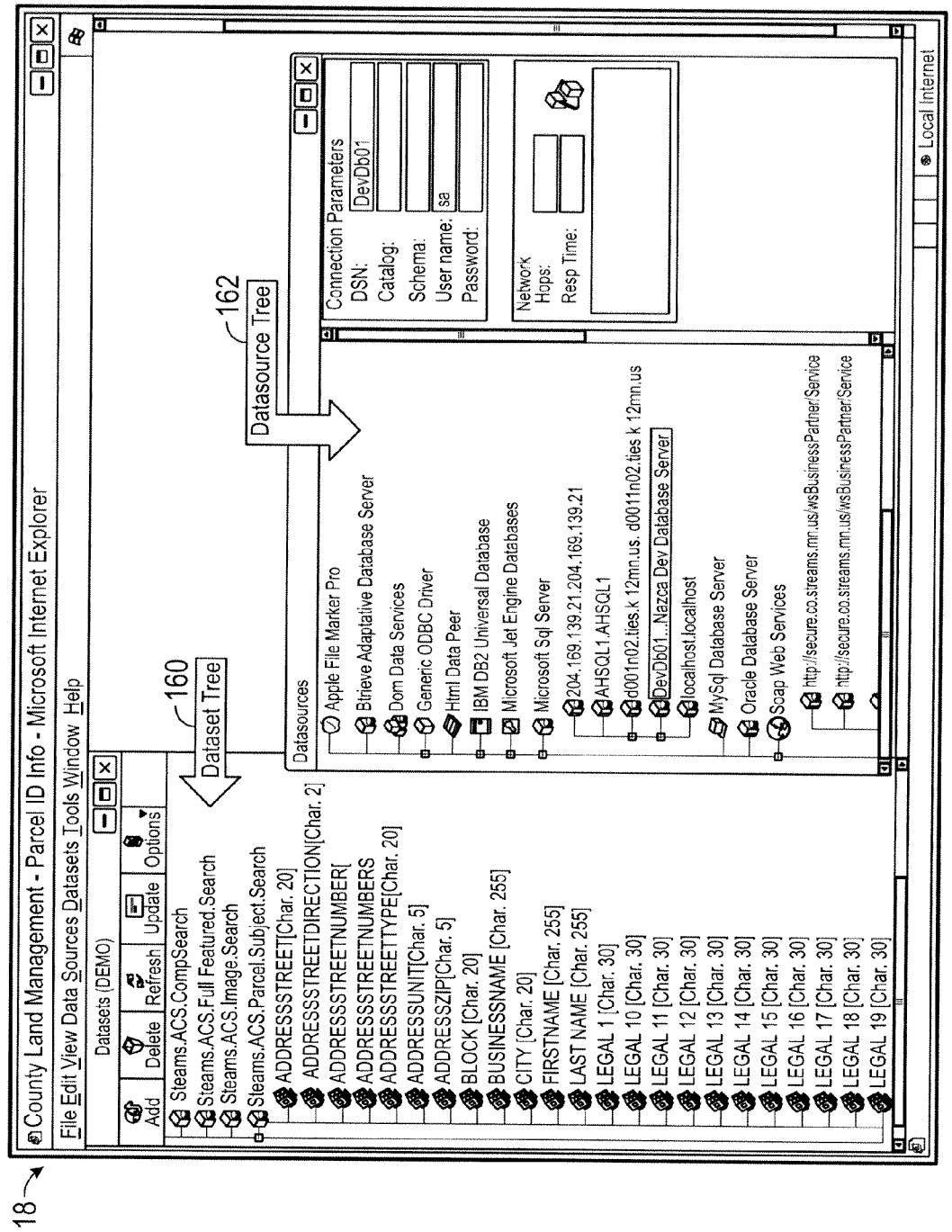
FIG. 24 illustrates a configuration tool in accordance with one embodiment.

The setup portion 12 of the midware system 10 is processed prior to user use of the system 10. During setup, foundation datasets are built. Thus, example data desired by a user 26 of the midware system 10 is established. For example, if the specific embodiment of the midware system 10 is to be used in a library, data that may be desired by a user may include title, author, genre, date of publication, etc. The various data items are used to create a dataset. The dataset, thus, may reflect a sort of form to be filled by the user portion 14 of the midware system 10 when the midware system 10 is processing a user request. A configuration tool 18 may be provided with the setup portion 12 of the midware system 10 to create the dataset or datasets. FIG. 24 illustrates an example configuration tool 18.

Generally, the setup phase is performed once for each installation of the midware system 10. Thus, the setup phase is performed prior to installation of the midware system 10 at a user facility. Users 26 at the facility may then run multiple requests using the dataset or datasets created in the setup phase. Alternatively, the setup phase may be periodically run to update the dataset or datasets are desired.

Data sources 28 of different types tend to be arranged in similar hierarchical fashion. Whether the data source 28 is a database defined by a schema of tables and columns or a GIS service containing layers and features, the ability exists in most systems to travel that hierarchy by asking questions. By asking appropriate questions, the structure of the data source 28 can be obtained in addition to the actual data. This improves the understanding of the data itself. Thus, in the setup phase, the data source 28 is explored to better understand the data contained within the data source 28 and the gathered information is used to develop a dataset.

The research, discovery and dataset building may be carried out by personnel 30 using the configuration tool 18 of the midware system 10. A configuration tool 18 may be provided with the midware system 10 to help and assist personnel 30 to research, explore, and understand data sources 28 such as databases, soap web services, legacy data sources, and other midware systems (thus, as will be described more fully below, one midware system 10 may use another midware system as a data source). The configuration tool 18 may be used to generate datasets and store them in a meta database 16 of the midware system 10. Building of the datasets based on the metadata of the underlying data sources 28 may be achieved in any suitable manner. Generally, metadata is the definition or description of the data. The metadata of the underlying data sources 28 is explored to determine the type of data held by those sources.

As shown in FIG. 24, in one embodiment of a configuration tool 18, the process of creating datasets includes developing a datasets tree 160. Thus, for example, the configuration tool 18 may allow a developer 30 to expand a datasources tree 162 and drag the desired field to a dataset on the datasets tree 160. Alternatively, the desired fields may be directly entered into a datasets tree 160. The definition of the desired field is stored in the meta database 16. In one embodiment, the creation of a dataset using the configuration tool 18 is a graphical user interface (GUI) toolset that allows a user to configure or maintain the dataset definitions. Drag-and-drop features may be provided in the toolset specifically for dataset fields and related properties to be accumulated from one-or-many data sources.

The meta database 16 of the midware system 10 stores metadata collected from the data sources 28 (for example, databases, legacy data sources, soap web services, imaging systems, GIS systems, or other midware systems. Thus, the meta database 16 stores the information known about the data in order to provide access to the data but does not store copies of the data itself. The meta database 16 may store the definition of datasets such that the service component of the user portion 14 may produce queries and execute them against the data sources.

In lieu of developing datasets during the setup phase carried out by the midware system, the midware system 10 may use a meta-database created by another tool to manage data. Thus, the foundation datasets need not be established by the midware system 10 but may be imported into the midware system 10 during the setup phase.

In a specific embodiment, a user 30 requests information from the midware system 10 by submitting a request. The request may be communicated directly to the midware system 10 or may be communicated to the midware system 10 from another application. Further, the request may be in any suitable form. For example, the request may be an XML request. The request is sent to a user portion 14 of the midware system 10 and is evaluated and processed by a service component 20 of the user portion 14. The service component 20 executes the dataset or datasets established by the setup portion 12 and performs related orchestration processing. In one embodiment, the service component 20 is a web service. The service component 20 of the midware system 10 manages data with data sources 28 via a data processing component 24. Additionally, the service component 20 may extract data from or write data to another midware system.

The extraction of data may be done by producing queries and executing them against the various data sources 28. Once the information is gathered, the service component 20 returns a response to the user 26 and the information may be displayed on the screen. The user 26 may send multiple requests to the midware system 10 with several responses being returned.

Alternatively, the midware system 10 may be used to write data to a data source 28. For example, a user 26 may submit a user request to record information about her mortgage. Based on one or more of the request's parameters, the midware system 10 uses the request to update information in one or more data sources 28. The request triggers formulation of an appropriate query (UPDATE, INSERT, and others depending on the SQL (or other language) dialect or type of data storage for each destination and source of the data). As will be understood to one skilled in the art, several commands may be programmed into the midware system 10 to provide a comprehensive coverage to extract and write data in data storage systems.

Figure 3:
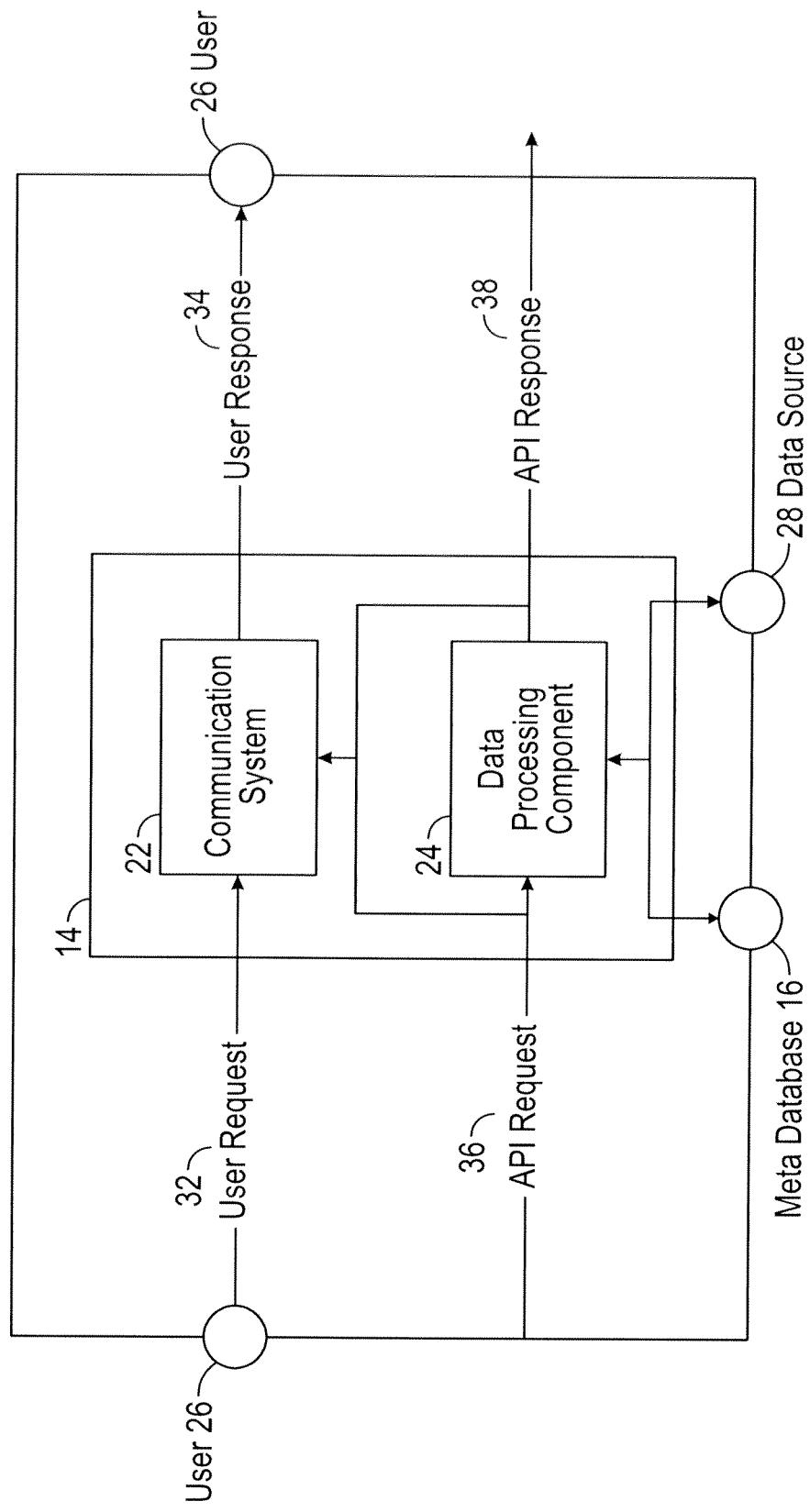
FIG. 3 illustrates a service component of a midware system in accordance with one embodiment.

As shown in FIG. 3, in one embodiment, the service component 20 comprises a communication system 22 and a processing component. The communication system 22 may be any suitable system for exchanging messages between a user 26 and the midware system 10. Thus, for example, the communication system 22 may be a system web service. Alternatively, the communication system 22 may be integral to the application wherein the application uses direct API (application programming interface) using the midware components directly, or open protocol such as OLEDB to request and receive data from the midware system 10. Two example open protocols are OLE DB and ODBC. OLE DB is a set of COM-based interfaces that expose data from a variety of sources. OLE DB interfaces provide applications with uniform access to data stored in diverse information sources or data stores. The Microsoft® Open Database Connectivity (ODBC) interface is a C programming language interface that makes it possible for applications to access data from a variety of database management systems (DBMSs).

In the embodiment wherein the communication system 22 is a system web service, the system web service encapsulates the functionality of the processing component 24 such that it can provide services as a web service. Generally speaking, a web service is a software application whose interfaces and bindings are capable of being defined, described, and discovered as, for example, XML artifacts. A web service supports direct interactions with other software agents using, for example, XML based messages exchanged via Internet-based protocols.

The communication system 22 receives the user request 32 and generates the response 34 via interaction with the processing component 24. The user request 32 is forwarded to the processing component 24 and processed in a manner shown in FIG. 4. The user response 34 is sent from the processing component 24 to the communication service for output to the user. The processing component 24 combines the user request 32 with an API request 36 and compiles a user response 34 based on an API response 38.

Figure 4:
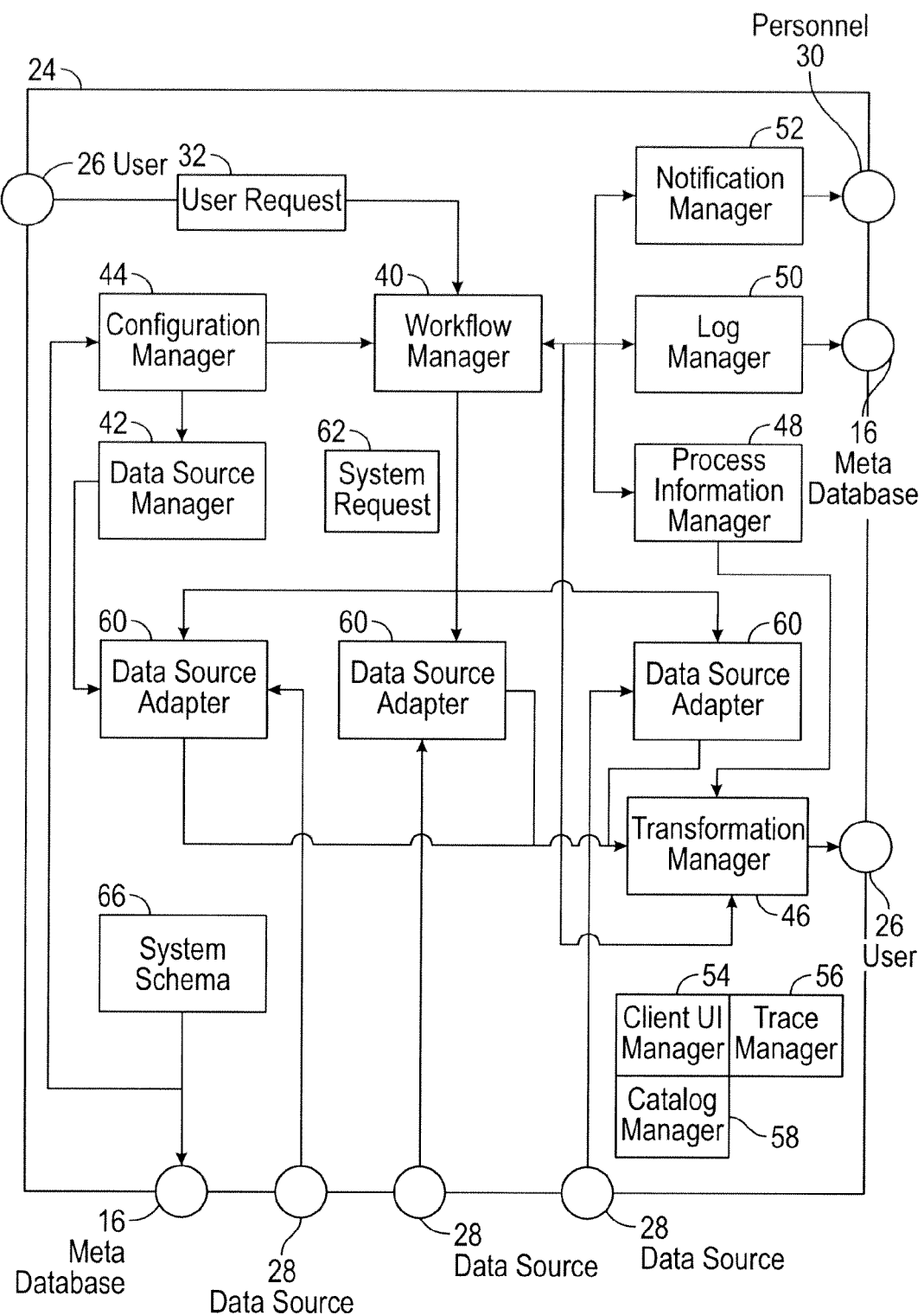
FIG. 4 illustrates process flow through a processing component in accordance with one embodiment.
Figure 4A:
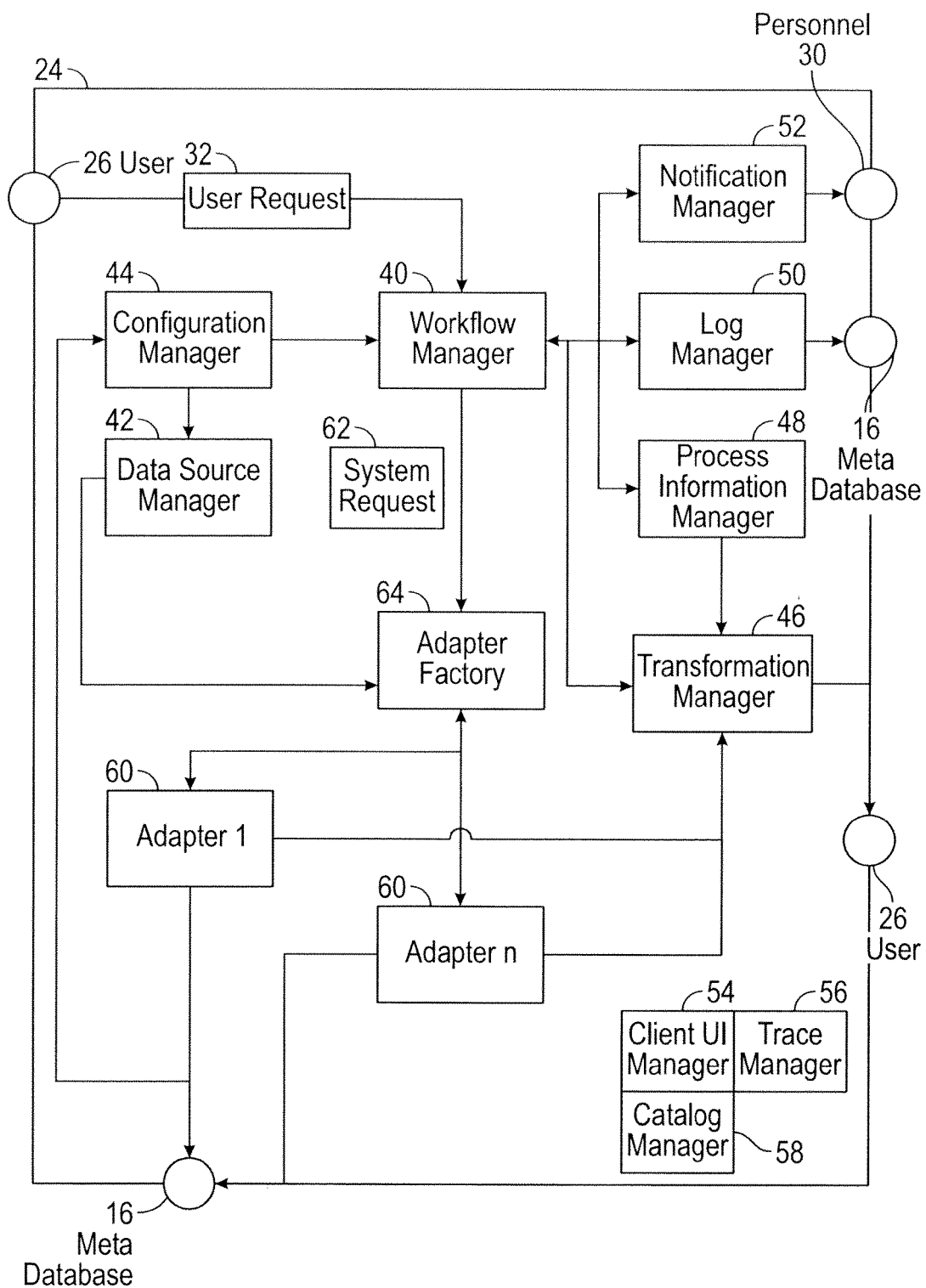
FIG. 4a illustrates process flow through a processing component in accordance with one embodiment.

FIG. 4 illustrates one example of process flow through the processing component 24. The user request 32 from the communication system 22 is processed by the midware system 10 to construct user interfaces, to provide debug information, and to provide operational and error logs. This processing may be done in any suitable manner. For example, a workflow manager 40 (see FIG. 5) may be used to parse, check, and make query level transformations on the request. The workflow manager 40 may, in turn, interact with several other managers. For example, a data source manager 42 (see FIG. 13), a configuration manager 44 (see FIG. 12), a transformation manager 46 (see FIG. 17), a process information manager 48, a log manager 50, a notification manager 52, a client user interface manager 54, a trace manager 56, a catalog manager 58, a variety of adapters 60 (such as an SQL (Structured Query Language) adapter, a web service adapter, a legacy adapter, and/or other adapters), and/or any other manager may be provided. As shown, the user request 32 is received by the workflow manager 40 and forwarded through the processing component 24 to at least one data source 28. These managers and adapters are intended to be illustrative of one embodiment for processing a user request 32 using the midware system 10 and are not intended to be limiting. Descriptions of some managers and adapters are given below.

A workflow manager 40 may be constructed using execution steps defined in the meta database 16 or another data repository such as an XML file. Each step may have stored actions such as run other programs, execute another set of workflow steps, send notifications, retry the operation, log the results, execute another step or the same set recursively, store information, retrieve information, or other stored action. These actions may be triggered by conditions also stored in the meta database 16 or another data repository such as an XML file.

The workflow manager 40 may use a transformation manager 46 to perform transformations on the user request 32. These transformations may be, for example, converting dates to numbers, numbers to text, etc. using dataset definitions provided by the configuration manager 44. Of course, other transformations may be performed and/or the transformations may be performed other than by a transformation manager 46. For example, custom extendable transformation types may be added using XSLT files. After the workflow manager 40 processes the user request 32 (including parsing, checking, and making query level transformations), the user request 32 becomes a system request 62.

The workflow manager 40 redirects the system request 62 to one or more adapters 60 depending on the sources to be queried to fulfill the request. In alternate embodiments, the system request 62 may be otherwise directed to one or more adapters 60. The adapters 60 are open architectural devices for communicating between the midware system 10 and other data source(s) 28. A plurality of adapters 60 may be provided, each adapter 60 being configured for communicating with a specific type of data source 28. For example, an SQL adapter, a web service adapter, and a legacy adapter may be provided. Other adapters 60 may be included for other data sources 28.

Example adapters 60 may include an SQL adapter, a web scrapper, an XML parser, a terminal stream, a GIS adapter, an imaging adapter, or a file system adapter. Each of these example adapters is discussed in the Example Adapter Table below.

| Example Adapter Table |
| --- |
| SQL Adapter |
| Function: Build queries to SQL Standards<br>Applies to: Relational databases, uses Native and ODCB drivers<br>Mode: Read & Write<br>Works based on the collected metadata. Translates requests in SQL. |
| Web Scrapper |
| Function: Build web requests (http, https, ftp, etc.) based on internet standards<br>Applies to: Data driven websites<br>Mode: Read (may write in a r/w data repository)<br>Works based on collecting information about web page data elements and re-using that to parse data out |
| XML Parser |
| Function: Build web requests based on XML schema<br>Applies to: XML sources<br>Mode: Read & Write<br>Parses XMLs files/sources based on a schema or collects from the file |
| Terminal Stream (3270, x25, tty, wise60, etc.) |
| Function: tap into a terminal stream to capture data<br>Mode: Read & Write<br>Metadata is composed by learning steps and by the data strem how to place application/screens. |
| GIS Adapter |
| Function: Make ARCIMS (and other Graphics Information Systems flavors) requests based on collected metadata (services, layers, data points, etc.).<br>Applies to: GIS servers and services<br>Mode: Read<br>Works creating XML queries to a GIS server |
| Imaging Adapter |
| Function: Extracts and submits image files (tiff, jpgs, pdf, etc.) to and from an imaging system (used to archive documents digitally by its scanned images)<br>Mode: Read & Write<br>Metadata is composed by several types (TCP/IP stream, databases, filesystem, etc.). Specialized drivers may be incorporated within the adapter depending on the functionality of the imaging system.<br>Drivers may connect to the server daemon using TCP/IP or other network protocols and request an image based on an index. |
| File System Adapter |
| Function: Collects files and data from an Operating System's file system<br>Applies to: Universal<br>Mode: Read & Write<br>Works parsing the file system and collecting information about the files. XML requests may request files to be sent through the wire. |

While the adapters 60 are conceptually split into a plurality of adapters, one for each data source, they may be combined into a single adapter.

The adapter 60 (whichever adapter 60 is relevant to the data source 28 to which the request is redirected) receives the system request 62 and creates a query to obtain the data from the underlying data source 28. The adapter 60 retrieves the data from the underlying data source 28 and returns it for processing into a response. In one embodiment, the adapter 60 transmits the data to the transformation manager 46.

In an alternative embodiment, shown in FIG. 4 *a*, the workflow manager 40 forwards the system request 62 to an adapter factory 64. The adapter factory 64 returns an adapter 60 for the underlying data source(s) 28. Thus, the adapter factory 64 determines the adapter 60 associated with the data source 28 to which a data query is sent. Each of the adapters 60 works based on the same framework, each can explore the data source 28, retrieve object hierarchy, and read and write data based on a request. As described more fully below, each adapter 60 may have a query generator or builder to build queries to interact with the data source 28. For example, a query generator may build SQL queries, ARCXML queries (for GIS systems), or other types of query. Depending on the request, any number of adapters 60 may be used to read or write, distinctly or in group, and the resultant data may then compiled in a response.

In addition to communicating with a data source 28 as described above, the midware system 10 may communicate with another midware system. This may be achieved via an adapter 60 or by other suitable means. Thus, the midware system 10 receiving the user request acts as a master midware system and the midware system acting as a data source 28 acts as a subservient midware system. During setup, the master meta database 16 is created with meta data information from the subservient midware system. During the user phase, the master midware system 10 communicates a user request 32 (as a query) to the subservient midware system. This may be done in the same manner as communication of a user request 32 to another data source 28. Thus, the user request 32 may be transformed to a system request 62 which, in turn, is converted to a dataset request sent to the data source 28 (this process is described more fully below). The subservient midware system processes that data query as it would process a user request 32 and communicates the query (processed as a user request) to another midware system or to other underlying data sources. The subservient midware system 10 generates a response and transmits that to the master midware system 10. Thus, the master midware system 10 meta database 16 may be created having information about other installed midware systems. The master midware system 10 may access the subservient midware system through several methods (remoting, web services, and others) and have them to forward the original request, gather results, and pass them back up on the hierarchy.

The transformation manager 46 receives data from the adapter 60 as raw data. The transformation manager 46 may perform one or more transformations to the data. Further, the transformation manager 46 may make query level transforms such as converting a date to a number before the query and converting the number back to the date after the query is run. The query level transforms thus may be used to display results in a meaningful way. This may be useful to query date related or filtered information such as when a user enters date information. Example one illustrates such transformation. In alternative embodiments, data may be returned to the user 26 in raw format.

EXAMPLE 1

In framing a user request, the user enters dates such as Jan. 3, 1993 and Jan. 4, 1993. The transformation manager transforms the dates on the query level such that the underlying query may be:

SELECT SALESVALUE, SALESPERSON, SALESDATE
FROM DATABASE.TABLE
WHERE SALESDATE BETWEEN 239384 AND 239385

The query results may be

| $1000.00 | Thomas Betweiller | 239384 |
| $2000.00 | Jane McDoe | 239385 |

The returned data may be:

```
<Data>
    <Row>
    <SALESVALUE>1000</SALESVALUE>
    <SALESPERSON>Thomas Betweiller</SALESPERSON>
    <SALESDATE>1/3/1993</SALESDATE>
    </Row>
    <Row>
    <SALESVALUE>2000</SALESVALUE>
    <SALESPERSON>Jane McDoe</SALESPERSON>
    <SALESDATE>1/4/1993</SALESDATE>
    </Row>
```

A notification manager 52 may be included in the processing component to send notifications to the user 26 and/or to personnel 30. The notifications may be sent via emails, SMS (Short Messages). IM (Instant Message), display on a computer screen, web site, pop-up windows, or any other suitable method. The workflow manager 40 may request the notification manager 52 to provide notifications, triggered by parameterized and data-driven conditions set in the configuration manager 44. These conditions may be, for example, errors, timeouts, other execution conditions, or a cascade of conditions. Alternatively, no notification manager 52 may be provided.

A log manager 50 may be included in the processing component 24 to record or log operations executed by the workflow manager 40. Thus, for example, the log manager 50 may record successful or unsuccessful queries, time outs, errors, or any other process results on the meta database 16 or any other data repository such as text files, XML files, flat files, etc. The log manager 50 may record performance information about queries and the mid ware system 10 as a whole such that this information may be used as feedback for the workflow manager 40 to improve the performance of the execution processes. Alternatively, no log manager 50 may be provided.

A process information manager 48 may be included in the processing component 24 to collect information about the querying process. Example information includes the actual query, for example an actual SQL query, the time taken to execute the request, the number of records returned, the status of the operation, errors, notifications, or others, etc. The process information manager 48 may also inject the collected process information into the response directly, using the transformation manager 46, or as a pass-thru. Generally, no alterations or format transformations are conducted on the result from the data source response. The response may be created as shown in FIG. 4 after the process information manager injection.

A system schema 66 may be included in the processing component 24 to retrieve information about the metadata from the data sources (e.g. databases) and store the information in the meta database 16 or other data repository. Other data repositories may be, for example, databases, flat files, text files, XML files, etc. This information may be used by the configuration manager 44 to supply information system-wide.

A client user interface manager 54 may be included in the processing component 24 to provide a common interface to applications designed to use the processing component's 24 API to manage its user interface operations. These interfaces may be meta database maintenance, user interface clues, loading datasets to trees, displaying data sources, etc.

A catalog manager 58 may be included in the processing component 24 to track changes on data sources 28 used in datasets. Notifications may then be triggered to avoid system difficulties and down time. The workflow manager 40 may be programmed to monitor and track these changes and perform notifications thru the notification manager 52. The workflow manager 40 may be programmed to log these changes thru the log manager 50 such that they may be used to adjust the dataset in response to changes in the data source 28. Further, the workflow manager 40 may be programmed to adjust datasets automatically to reflect changes in the underlying data sources 28, and to avoid or reduce down time.

Figure 5:
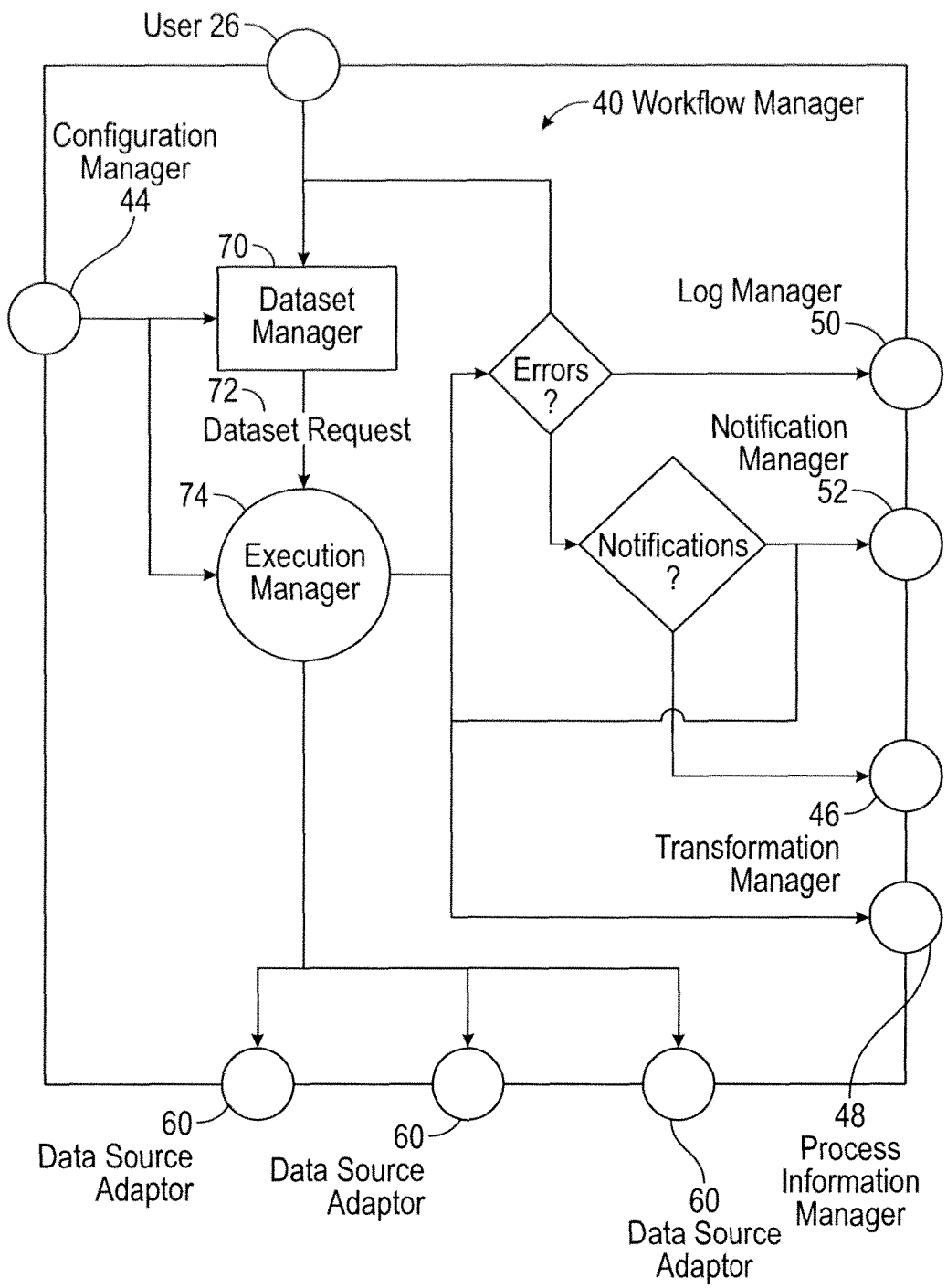
FIG. 5 illustrates a workflow manager of a processing component in accordance with one embodiment.

Process flow of the workflow manager 40 is illustrated in FIG. 5. As shown, the workflow manager 40 comprises a dataset manager 70 (see FIG. 6) and an execution manager 74 (see FIG. 10). In the embodiment of FIG. 5, process flow is illustrated serially. In alternative embodiments, process flow may be done in parallel or concurrently, as will be described more fully below. As stated above, the user request 32 from the communication system 22 may be directed to a workflow manager 40. While a workflow manager 40 is described as an example means for developing a user request 32, other means will be obvious to one skilled in the art and are within the scope of the present invention. The workflow manager 40 parses, checks, and makes query level transformations on the user request 32. The workflow manager 40 thus develops the user request 32 into a system request 62. A dataset manager 70 may be provided within the workflow manager 40. The dataset, established in the setup phase, sets the shape of the response. The dataset may have nested datasets and transformation sets that are defined and executed by the transformation manager 46. A dataset is generally executed recursively, by a triggered request coordinated by the workflow manager 40. The dataset manager 70 validates the system request 62 and completes it with information from the dataset design. The information may be paging information, information to display the correct page within several pages, the number of records to be returned, sorting information, filtering information, or other information. After being validated and completed with the information needed to retrieve the data (described more fully with reference to FIG. 6), the system request 62 is thus converted to a dataset request 72. The dataset request 72 is then processed through the execution manager 74 to the data source adapter(s) 60.

Thus, the user request 32 is an external request submitted by a user 26 to the midware system 10. The user request 32 is transformed to a system request 62 by the workflow manager 40. The system request 62, in turn, is converted to a dataset request 72. A dataset request 72 is one or many executions of dataset definitions. After execution of the dataset request 72, the workflow manager 40 responds to the system request 62 with the results of the dataset request 72. The workflow manager 40 may also note the status of the processing within the service component execution (for example, timeout, success, error, etc.).

As referenced above, the dataset requests 72 may be executed in parallel. Thus, dataset requests 72 may be sent to multiple data sources 28 at the same time. Further, when data for a portion of the dataset has been retrieved from one or more data sources 28, that portion of the request may be considered fulfilled. Thus, redundant data may be avoided when the same data is sought in redundant or same content sources.

An execution manager 74 may be provided within the workflow manager to take the dataset request and execute it based on the workflow rules and settings. The execution of the dataset request may extend across multiple data sources 28.

After the execution of the dataset request 72 is completed or times out, the execution manager 74 gathers results, if any, and/or exceptions, if occurred, evaluates them and proceeds to the next step until the request as a whole is completed or fails. As stated above, the workflow manager 40 responds to the system request 62 with the results of the dataset request 72. The execution manager 74 may also supply process information to a process information manager 48, if provided.

Figure 6:
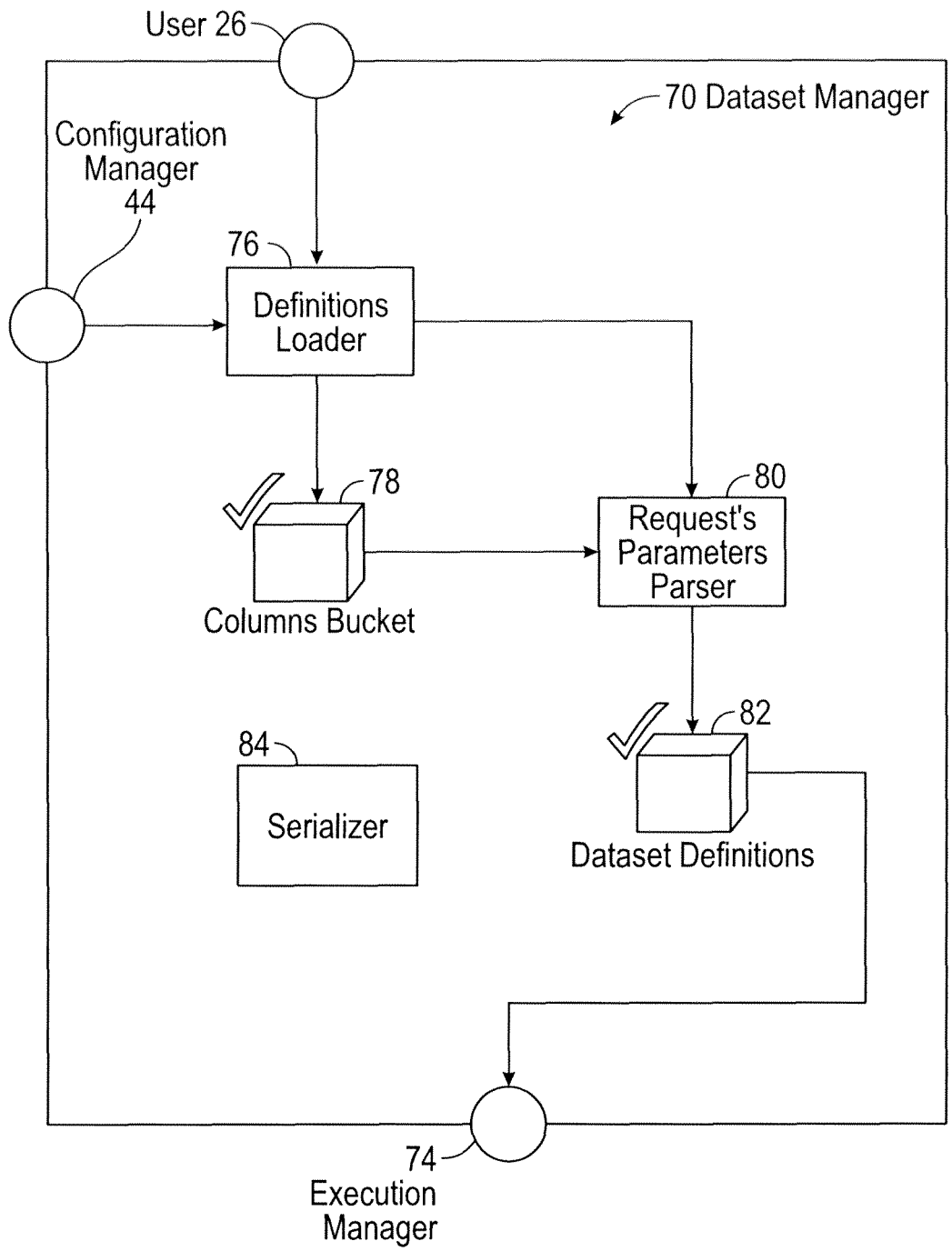
FIG. 6 illustrates a dataset manager of a workflow manager in accordance with one embodiment.

FIG. 6 shows a dataset manager 70 of the workflow manager 40. The dataset manager 70 is the part of the workflow manager 40 responsible for transforming a system request 62 into a dataset request 72. Following is a description of the transformation of the system request 62 into a dataset request 72 in accordance with one embodiment. This task includes loading the dataset definitions from the meta database 16. The dataset definitions are the definitions of the datasets that enable the service component 20 to produce queries and execute them against a data source 28. The open adapters 60 described above enable queries against such data source(s) 28. After the definitions have been loaded, the entered parameters are validated against these definitions. In one embodiment, the system request 62 may pass filter, sort, conditions, etc. to the service component 20 in addition to named-values to populate a series of WHERE clauses in the SQL statements (note that for the purposes of illustration, SQL is referenced herein, however, a language other than SQL may be used) or statements the underlying adapter 60 uses to communicate to the data source 28. In one embodiment, as the actual SQL is generally created dynamically based on the system request parameters, a parameter parser and column parser are executed in the process, directed by the workflow manager 40. The system request's 62 parameters related to how the data should be returned are identified. These parameters may include the number of records, paging specifics, filtering, parsing, transformations, etc. Generally, these parameters are passed parameters in a Web Service method request and originate from the user of the request.

A definitions loader 76 may be provided within the dataset manager 70 to load definitions from the configuration manager 44 and temporarily store them, for example, in a columns bucket 78.

A request's parameters parser 80 (see FIG. 7) may be provided within the dataset manager 70 to check the requested columns from the system request 62 and match them with the ones in the columns bucket 78. In one embodiment, the columns comprise fields to be retrieved within the SELECT section of the SQL statement, and/or the fields to utilize in a JOIN WHERE clause. The request's parameters parser 80 adds the requested parameterized information such as sorting, visibility, filtering, distinct records, paging, etc. to the system request. The requested parameterized information is generated with the system request and is processed by a parameter parser. The parameters at the column level may be integrated to the column objects in the columns bucket 78. The request's parameters parser 80 may also identify and parse the parameters of the request which are at the dataset level and add them to the dataset definitions bucket 82. Dataset definitions generally are stored persisted in the meta-database 16. Example parameters at the dataset level include WHERE clause values against a dataset definition property.

As stated above, after being validated and completed with the information needed to retrieve the data, the system request 62 becomes a dataset request 72. Thus, after the parsing and matching by the request's parameters parser 80, the system request 62 is a dataset request 72. The dataset request 72 is communicated to the at least one adapter 60. This communication may be done, for example, via the execution manager 74.

A serializer 84 may also be included in the dataset manager 70 to maintain the dataset's definitions in the meta database 16 through the configuration manager 44.

Figure 7:
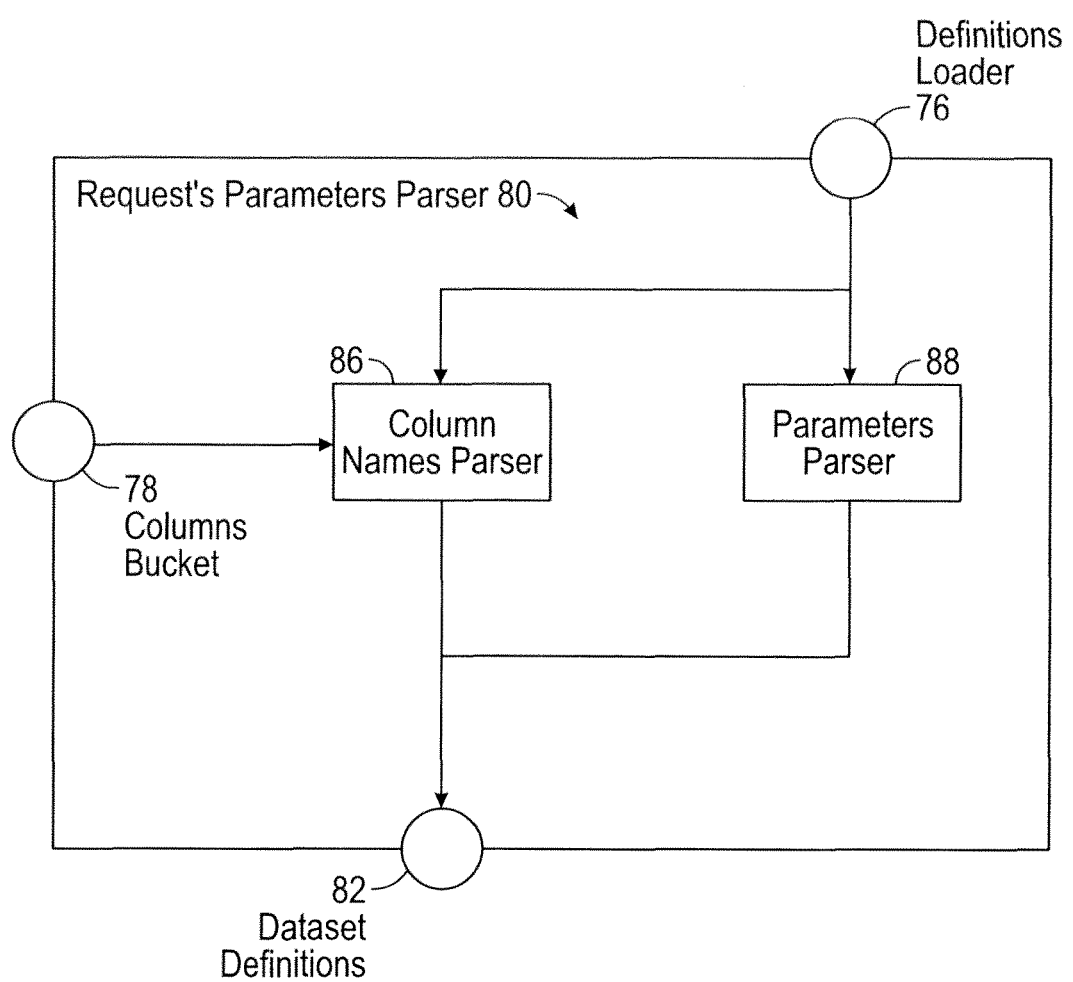
FIG. 7 illustrates a request's parameters parser of a dataset manager in accordance with one embodiment.

As shown in FIG. 7, the request's parameters parser 80 may include two main functional blocks: a column names parser 86 and a parameters parser 88. The columns names parser 86 identifies, parses and selects the column information packaged in the system request 62. This information is stored in the column object's properties. The parameters parser 88 identifies, validates, parses and selects the dataset level information packaged in the system request 62. This information is stored in the dataset object's properties. The parameters parser 88 and the functional blocks of the parameters parser 88 are example means for developing dataset object's properties. Other means may alternatively be used. FIGS. 8 *a* and 8 *b* illustrates example information included in the dataset properties 90 and the column properties 92 with reference to the relational database adapter.

Figure 9:
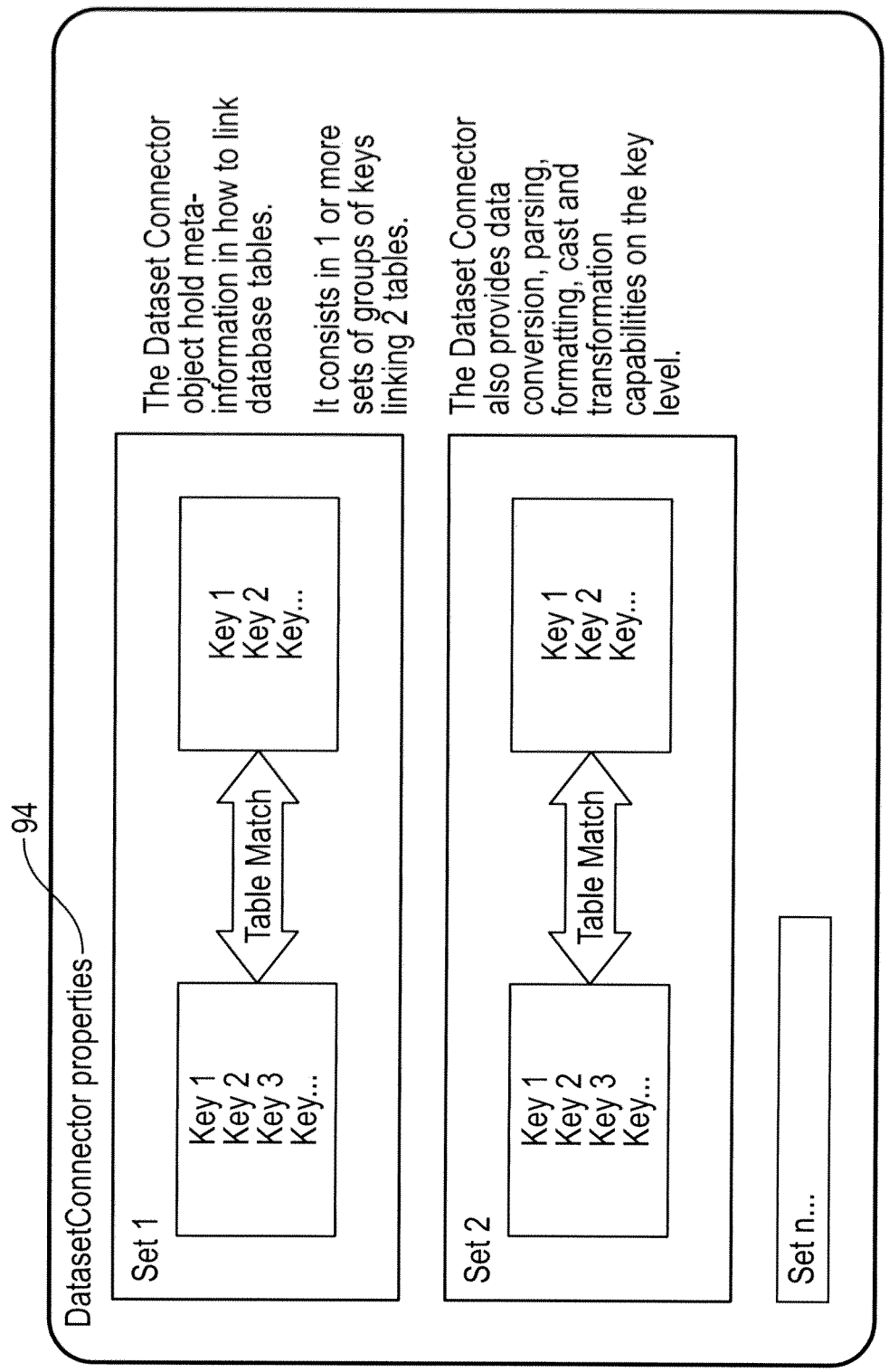
FIG. 9 illustrates example dataset connector properties in accordance with one embodiment.

The dataset object's properties where the dataset level information is stored, as described in relation to FIG. 7, may include a collection of connectors. FIG. 9 illustrates example dataset connector properties 94. The connectors store information on how to connect or link one table to another. Generally, data from two tables may be combined to form a third, joined, table, for example via SQL Join. Further operations may be performed on the third table. One dataset may go across several tables. Information from a dataset may include several tables, views, stored procedure results, physical files, Web Service responses, or API results. Multiple connections or combinations may be necessary. Further, one dataset may group other datasets. That is, datasets may be nested. For one dataset to group another dataset, the one dataset must store enough information to connect to the data source file and produce and run heterogenous queries hosting the join process in one of the data sources, or store temporary data in memory or any other repository, thus creating the resultant virtual joined table. Examples of a database server/service/database file include Access MDB files, text files, XML files, etc.

An example of combining, or joining, two tables is as follows. A query may run across two disparate data sources, one running on Microsoft SQL Server and the other an AS400 DB2 Universal Database. The following query demonstrates how to join or combine a first table with document on the Microsoft SQL Server database with a second table on a DB2 table. The first table is called [SpiderDemo].[dbo].[RcdocnPF], the second table is called TRACTDB-F.RCNAMEPF. The matching field between the two tables is the field DCDOC# on the SQL side and the field NMDOC# on the DB2 side.

```
SELECT
   B.NMDOC# AS DocNumber,
   B.NMNAME AS [Name],
   A.DCAORT AS Abstract_Torrens,
   A.DCINST AS Instrument_Type,
   A.DCFEE AS Paid_Fee
   FROM [SPIDERDEMO].[DB].[RCDOCNPF] AS A
   JOIN OPNQUERY (AS400,
      'SELECT NMDOC#, NMNAME
      FROM TRACTDBF.RCNAMEPF
      WHERE NMNAME LIKE "WELCH CHARLES e%"') AS B
   ON (A.DCDOC# = B.NMDOC#)
```

The query above may result in the following results:

| DocNumber | Name | Abstract_Torrens | Instrument_Type | Paid_Fee |
|---|---|---|---|---|
| 788900 | WELCH CHARLES E | A | QCD | 19.50 |
| 814065 | WELCH CHARLES E | A | SM | 19.50 |

As shown, a database connector holds information on how to link database tables. It comprises one or more groups of keys linking every two tables. The dataset connector may also provide several data transformation operations such as data conversions, parsing, formatting, casting, etc. on a key level to be able to link all types of tables to each other. The key level may comprise normalized relationships from one table to another, via a primary key. Based on these transformations, the database connector may link tables which don't have necessarily the same type of data on the link fields. If a='2345' and b='2.3.4.5', transformation foo (xxxx)='x.x.x.x' enables linking foo(a).

Figure 10:
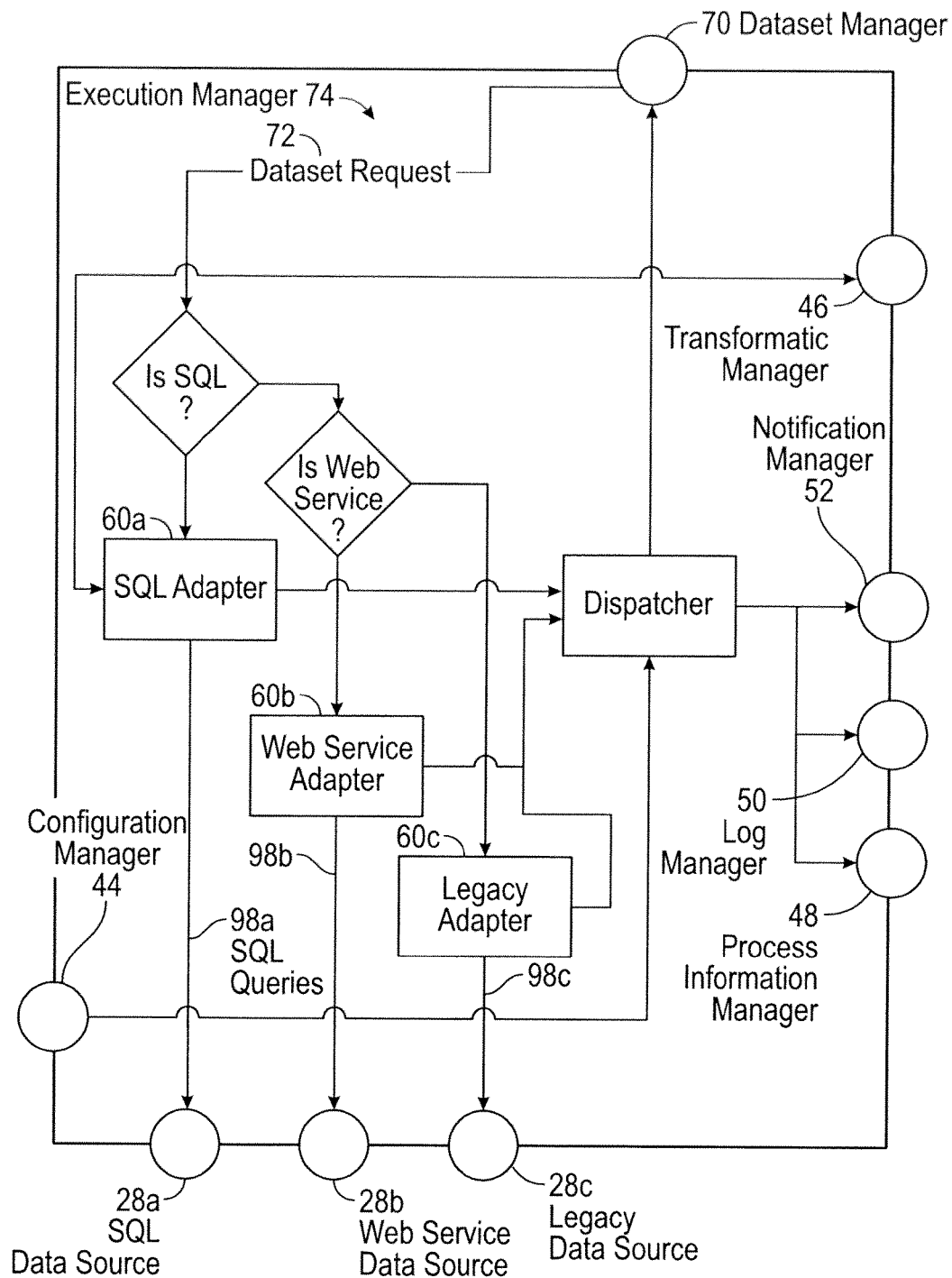
FIG. 10 illustrates an execution manager of a workflow manager in accordance with one embodiment.

Returning to FIG. 5, the workflow manager 40 may include a dataset manager 70 and an execution manager 74, with the dataset request 72 being passed from the dataset manager 70 to the execution manager 74. FIG. 10 illustrates process flow through an execution manager 74 in accordance with one embodiment. The execution manager 74 receives a dataset request 72, identifies the underlying type of data source 28 the request runs against, executes the request, and takes the correct actions after the request's execution or failure. In the embodiment of FIG. 10, the execution manager 74 processes the request serially. That is, the execution manager 74 checks for each type of data source 28 serially before proceeding to another. In alternative embodiments, the execution manager 74 processes the request in parallel.

The dataset request 72 is received from the dataset manager 70 and verified to identify an adapter 60 for handling the request 72. Dataset requests 72 may include multiple types of sources, in which case the request is broken into corresponding subrequests that are then forwarded to the appropriate adapter 60. The adapter 60 communicates between the midware system 10 and the data source 28. The adapter 60 executes the part of the request on its domain. Once the queries are executed, results such as data, exceptions, timeouts, etc. are analyzed and sent to a dispatcher 96 (see FIG. 11) to generate logging notifications and the data is returned to the user. The dispatcher 96, if provided, may communicate with the notification manager 52, the log manager 50, and/or the process information manager 48.

Thus, if the dataset request 72 includes SQL data to extract, the dataset request 72 is sent to the SQL adapter 60 *a*, where SQL queries 98 *a* are generated and run against the data sources 28 *a* where the data resides. If the dataset request 72 has SOAP web services data to extract, the dataset request 72 is sent to the web service adapter 60 *b*, where the SOAP request 98 *b* is generated and run against the web service provider 28 *b*. If the dataset request 72 has legacy data to extract, the dataset request 72 is sent to the legacy adapter 60 *c*, where the correspondent requests 98 *c* are generated and run against the systems 28 *c* where the data resides. The forwarding of the dataset request 72 to the appropriate adapter 60 and subsequent extraction of the data from the appropriate data source 28 may be referred to as data extraction.

Figure 11:
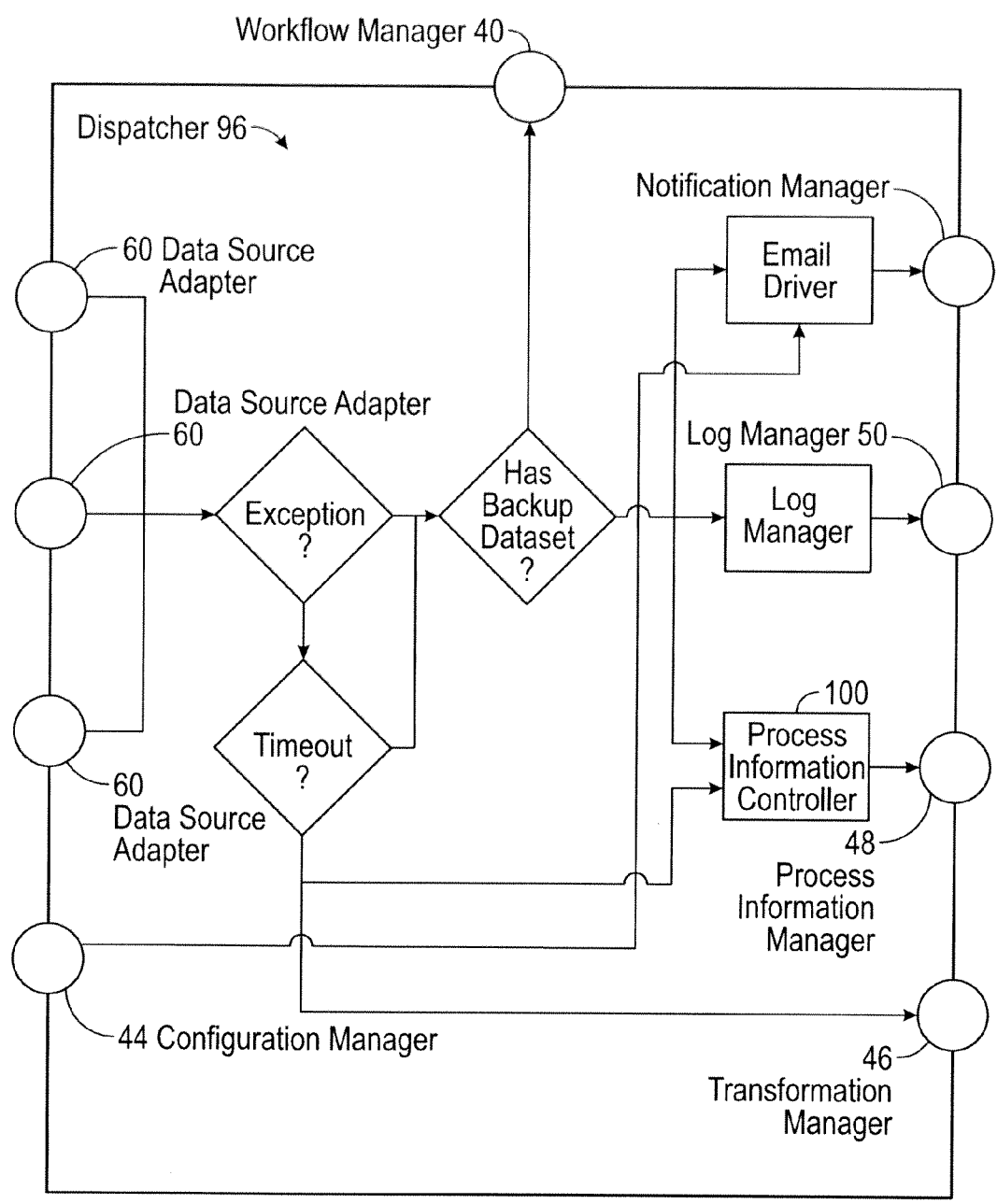
FIG. 11 illustrates a dispatcher of an execution manager in accordance with one embodiment.

As noted above, a dispatcher 96 may be provided to generate logging notifications regarding results such as data, exceptions, timeouts, etc. FIG. 11 illustrates an example process flow of such a dispatcher 96. The dispatcher 96 interacts with several components such as the notification manager 52, the log manager 50, the process information manager 48, the transformation manager 46, and/or the configuration manager 44. These components are described more fully in reference to FIG. 4. Reference is thus made to FIG. 4 during the following discussion. The dispatcher 96 may be configured as a common generic module used by several data drivers to analyze the results of execution of requests against data sources 28. A data driver is one or many classes that are used based on a data source type. For example, SQL Server, Oracle, DB2, FoxPro, Paradox, Web Service, etc. After the data extraction attempt is made, if successful, data is sent to the transformation manager 46 where the process is finalized as a whole. If notifications are necessary, the correspondent information is sent to an email driver where the data to be sent is collected from the execution process and the addresses are passed by the configuration manager 44.

If exceptions or errors occurred, the log manager 50 may be used to collect information and build messages to be logged. The log manager 50 may also log performance information such as query results, time to execute, exception tracking, etc.

A process information controller 100 may collect, format and send information about the execution of the requests to the process information manager 48 which may then be attached to the results for evaluation and debugging purposes. The process information controller 100 may act as an interface to the process information manager 48, preparing the messages, queries, and request descriptions. The process information controller 100 may receive information about successful executed requests, and post it back to the user for clarification or debugging purposes.

Timeouts and exceptions may be analyzed and, if there were assigned backup datasets to run, the dataset request 72 may be transformed back into a system request 62. Sequential backup data sources 28 may have separate dataset definitions. The workflow manager 40 may execute a backup dataset if the primary dataset response is unsuccessful. Information about the exception may be added to the system request 62, the system request 62 being sent back to the workflow manager 40 for another cycle of execution. The cycle of execution is shown in FIG. 4.

Figure 12:
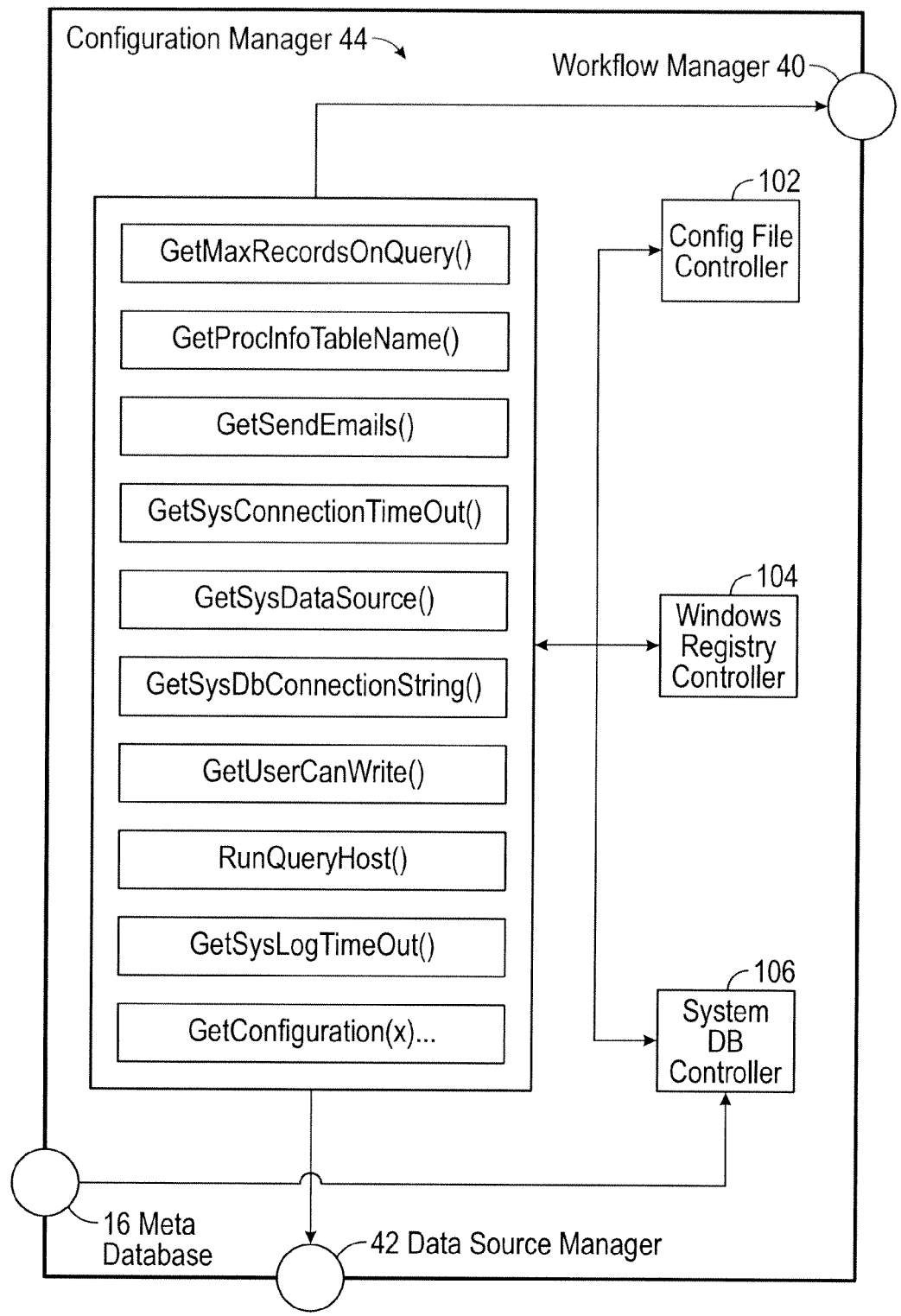
FIG. 12 illustrates a configuration manager of a processing component in accordance with one embodiment.

FIG. 12 illustrates a configuration manager 44 of a processing component 24 such as that shown in FIG. 4. The configuration manager 44 supplies a common set of interfaces and functions used system wide. Configurable information may be managed and maintained by the configuration manager 44. Example configurable information includes connection credentials, caching setup, paths, etc. Such information may be stored within a configuration file and its maintenance may be performed by a configuration file controller 102. The configuration manager 44 thus may offer high-level interfaces to the other modules of the system (such as other managers) to store and retrieve information in such configuration files.

If a user entity desires to use the midware system 10 on a Windows interface, a windows registry controller 104 may be included in the configuration manager 44 to handle configuration information stored on Microsoft Windows computers. The windows registry controller 104 then wrap, via a code base surrounding an existing collection of components, all the maintenance, storage, and retrieval of Microsoft Windows Registry's based information for the other modules of the midware system 10. Alternatively, the midware system 10 may be run in a non-Windows environment.

The processing component 24, shown in FIG. 4, may store configuration and metadata information on a data source 28 such as datasets, schema information, configuration information, logs, performance information, etc. The configuration manager 44 may include a SystemDB controller 106 to wrap and manage storage, retrieval and maintenance of information on the meta database 16. Other modules of the processing component 44 may use the SystemDb controller 106 to access this information.

Further, the configuration manager 44 may offer an API with several functions to be used for other modules system wide.

Figure 13:
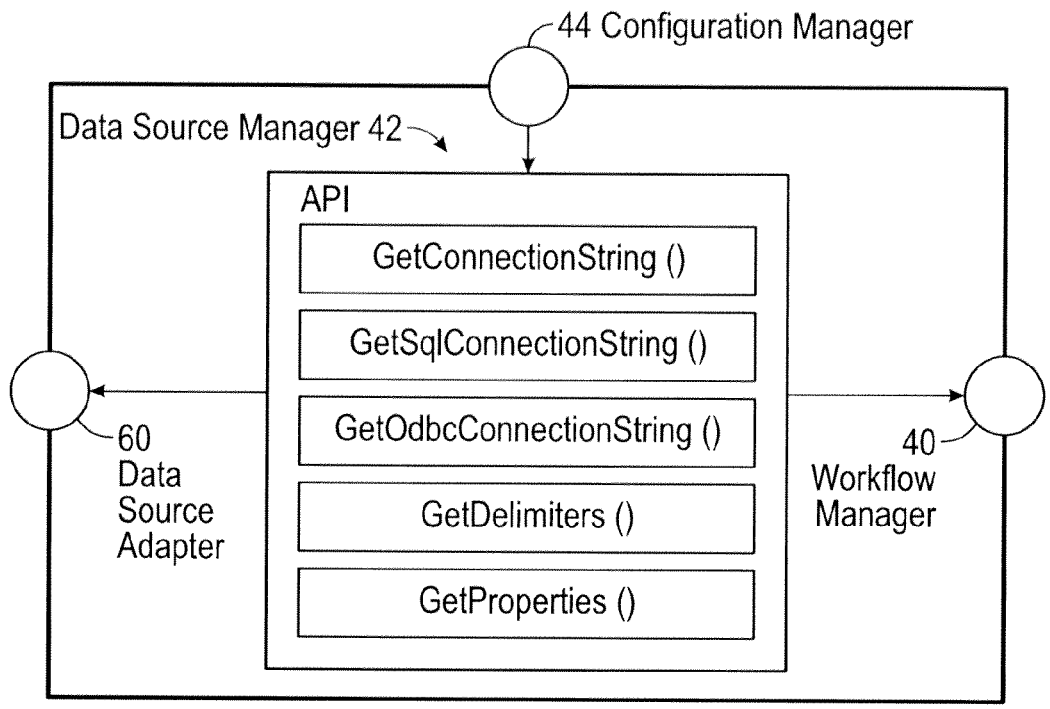
FIG. 13 illustrates a data source manager of a processing component in accordance with one embodiment.

FIG. 13 illustrates a data source manager 42 of a processing component 24 such as that shown in FIG. 4. The data source manager 42 stores and retrieves (through the configuration manager 44 of FIG. 12), information about the data sources 28 for the mid ware system 10 to access. The information may then be used to translate queries and parts of queries depending on the underlying data source 28 type. The data source manager 42 may also manage information as to how to access a data source and the disparate ways to connect to a data source 28. The data source manager 42 may have a common API to provide a data abstraction layer to other portions of the processing component. Generally, these portions may comprise collections of modules, functions or classes.

Figure 14:
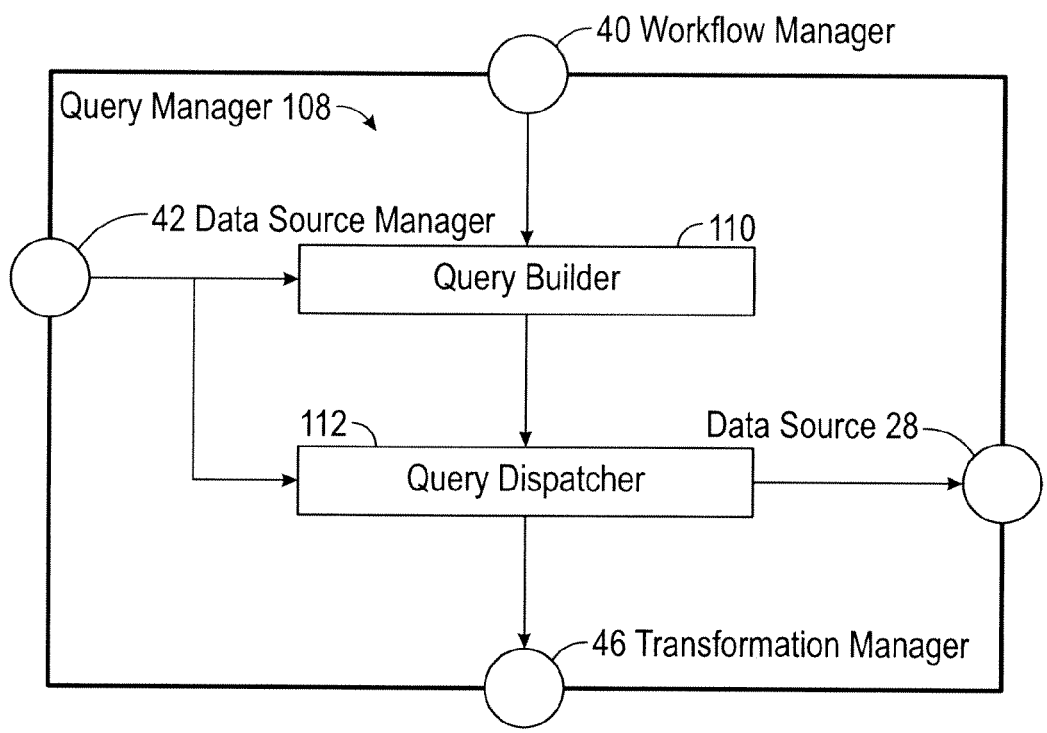
FIG. 14 illustrates a query manager in accordance with one embodiment.

FIG. 14 illustrates a query manager 108. A query manager 108 is a sub module of an adapter 60. The query manager 108 comprises two major components: a query builder 110 (see FIG. 15) and a query dispatcher 112 (see FIG. 16). The query builder 110 creates the queries to be run against the data sources 28 based on the requested parameters in the dataset request 72. The query manager 108 herein described is an exemplary means for developing queries based on the dataset request 72. Other means will be obvious to one skilled in the art and are within the scope of the present invention. A dispatcher of the query manager 108 asynchronously executes queries on one or more base systems. As discussed previously, the workflow manager 40 processes the system request 62 into a dataset request 72, the parameters having been determined within the dataset manager 70. The dataset request 72 is then forwarded to the query manager 108. The query manager 108 creates the correct query for the type of underlying data source 28, based on specific information of each one provided by the data source manager 42 and the other parameters given by the user request 32. Once the query is generated, it is passed to a query dispatcher 112. The query dispatcher 112 may also use data source's specific information supplied by the data source manager 42. The query dispatcher 112 runs the queries against the data source 28 and passes the data to the transformation manager 46 for record level transformations. Thus, each record and applicable properties are evaluated and adjusted during the transformation process, based on condition matches or processing definition requirements.

Figure 15:
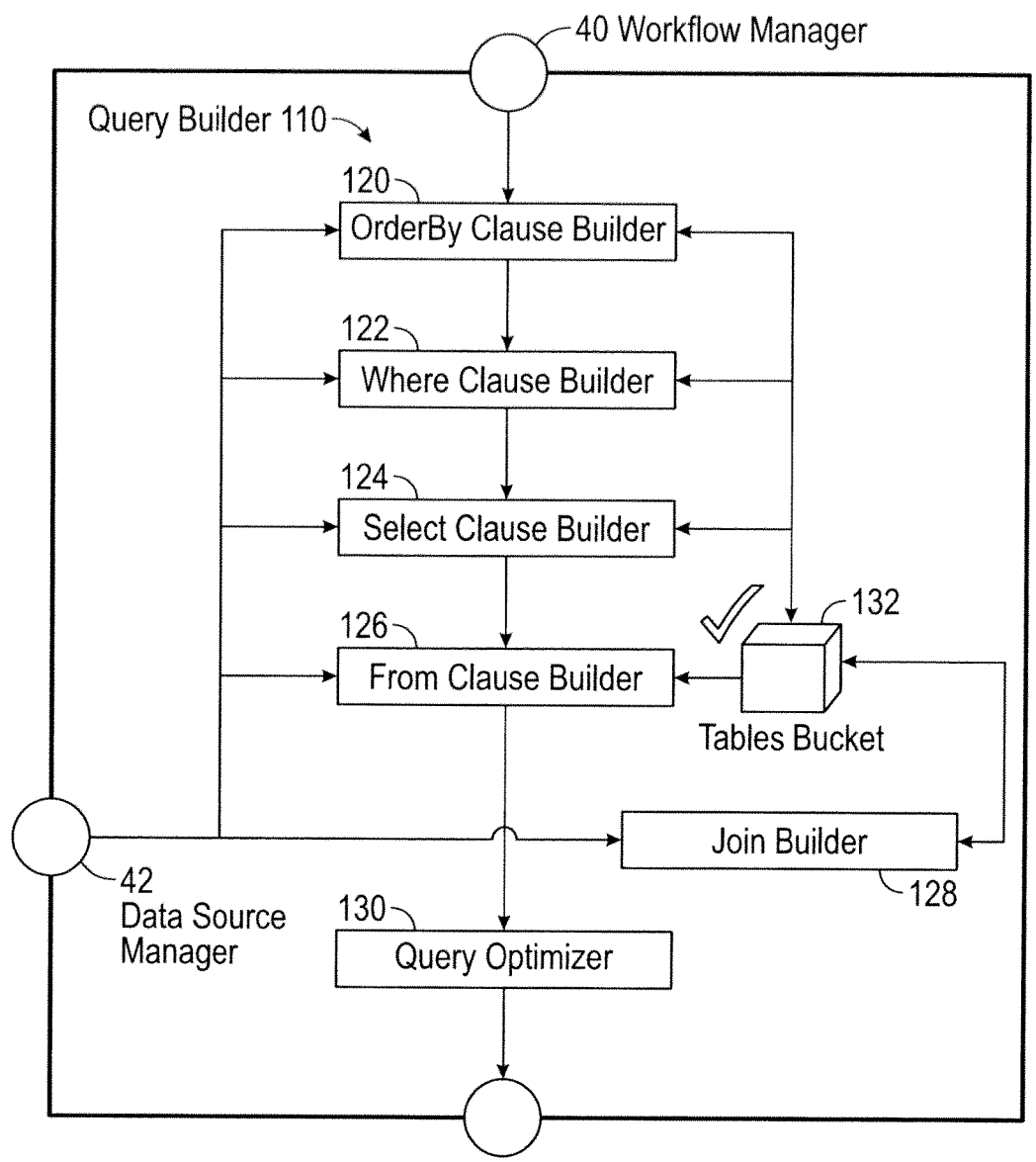
FIG. 15 illustrates a query builder of a query manager in accordance with one embodiment.

An example process flow of a query builder 110 is shown more specifically in FIG. 15. In some situations the order of tables is relevant in a query. For example, a database management system can not parse queries where the use of the data is from an undeclared join. A specific example is set forth below. As shown in the example, if Table3 is joined before Table2 is joined, the query will not run.

Select *
From Table1
    Join Table2 On (Table1.field1=Table2.field2)
    Join Table3 On (Table2.field2=Table3.field3)

Thus the following query can not execute.

Select *
From Table1
    Join Table3 On (Table2.field2=Table3.field3)
    Join Table2 On (Table1.field1=Table2.field2)

Figure 25:
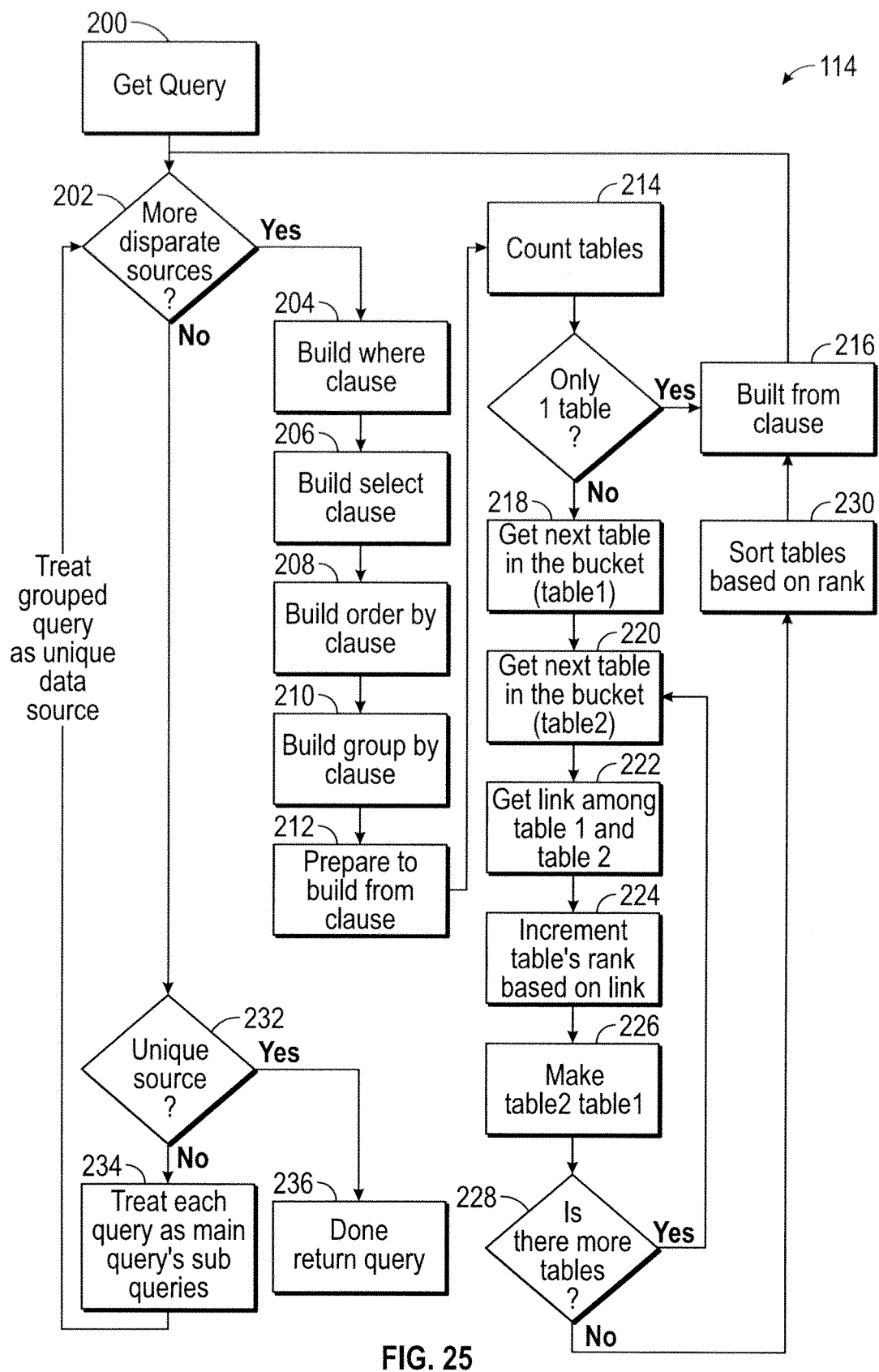
FIG. 25 illustrates a method of query building in accordance with one embodiment.

While not only one order can be successful, at least one is. Any suitable process may be used for generating a query. FIG. 25 illustrates a process flow of one process 114 for generating a query. In this process, logic based on the weight of each table in the query is used to build the joins in the correct order. As shown, a query is received at block 200. An initial inquiry is performed to determine if there are disparate sources, shown at block 202. If there are disparate sources, a series of clauses are built. At block 204, the Where clause is built. At block 206, the Select clause is built. At block 208, the Order By clause is built. At block 210, the Group By clause is built. At block 212, preparation is done for building the From clause. After the clauses are built, the tables are counted, shown at block 214. If there is only one table, the From clause is built at 216 and the process returns to block 202 where it is determined whether there are more disparate sources. If there is more than one table, the next table in the bucket (table1) is gathered, shown at block 218. Thereafter, the next table in the bucket (table2) is gathered, shown at block 220. A Link is determined among table1 and table2, shown at block 222. Based on the link, the tables' rank is incremented, shown at block 224. Table2 Table1 is developed at block 226. If there are more tables, the process returns to block 220. If there are no remaining tables, the tables are sorted based on rank, shown at block 230. Thereafter, the From clause is built, shown at block 216 and the process returns to block 202 where it is determined whether there are more disparate sources. Once there are no remaining disparate sources, it is determined wither there is a unique source, shown at block 232. If there is a unique source, the query is returned at block 236. If there is not a unique source, each query is treated as a Main Query's sub queries, shown at block 234. The Grouped query is then treated as a unique data source and the process returns to block 202.

Figure 26:
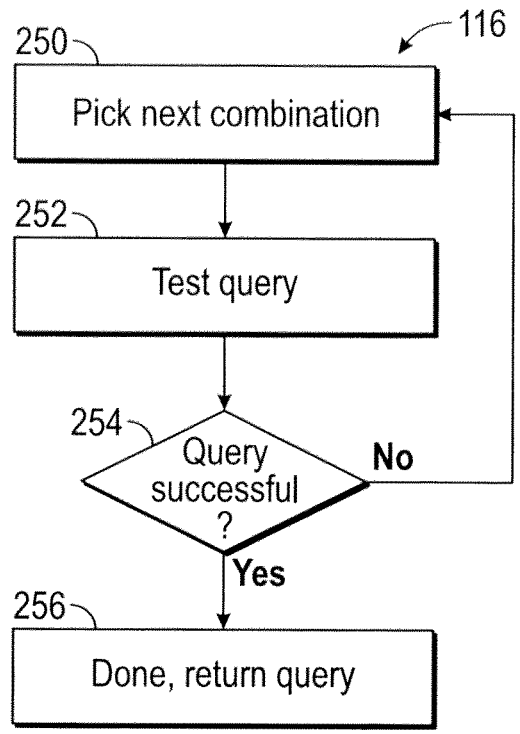
FIG. 26 illustrates a method of query building in accordance with one embodiment.

FIG. 26 illustrates an alternative process flow 116. In this process, combinatorics are used. As shown, a combination is picked at block 250. The query is tested at block 252. At block 254, it is determined whether the query was successful. If yes, the process is finished and the query is returned at block 256. If not, the process returns to block 250 and another combination is chose.

Figure 27:
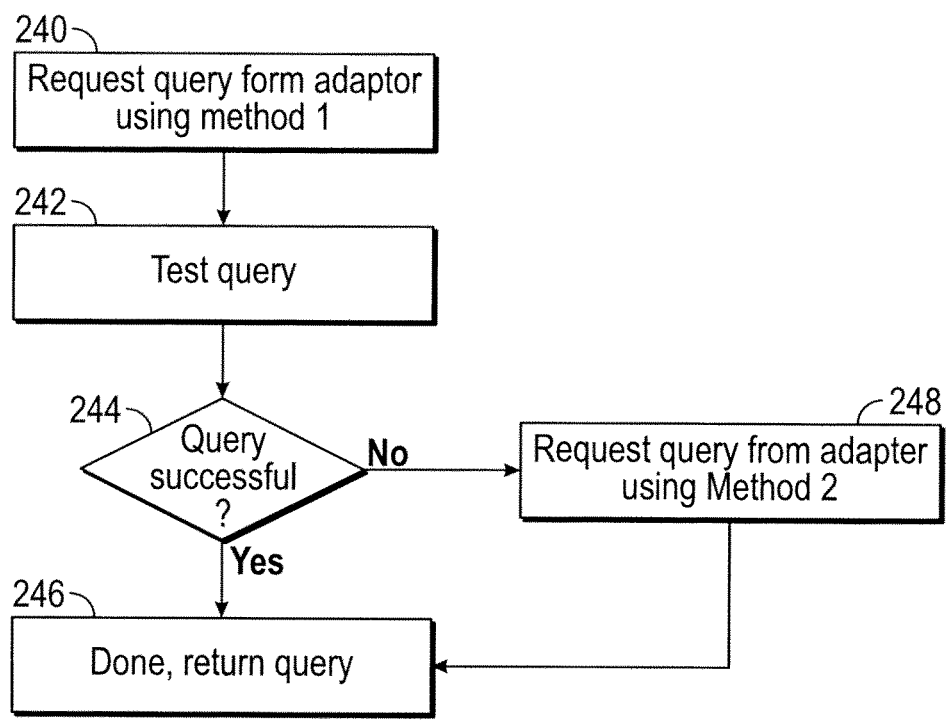
FIG. 27 illustrates a process of query building using the methods of FIGS. 25 and 26.

While the process of FIG. 26 is less likely to fail than the process of FIG. 25, it is much more time consuming. Generally, the process of FIG. 26 is used if the process of FIG. 25 fails. Thus, as shown in FIG. 27, a query is requested from the adapter using the method (Method 1) of FIG. 25, shown at block 240. The query is tested at block 242 and it is determined whether they query was successful at block 244. If yes, the query is returned at block 246. If no, the query is requested from the adapter using the method (Method 2) shown in FIG. 26.

As shown in FIG. 15, the query builder 110 may build SQL queries (or queries based on another language) based on the dataset request 72. FIG. 15 specifically illustrates the query builder 110 in relation to SQL queries. However, queries may be built in any suitable language using the query builder 110. Alternatively, the query builder 110 may build Web Service requests, application executions, parsing routines, etc. The query builder includes an ORDER BY clause builder 120, a WHERE clause builder 122, a SELECT clause builder 124, a FROM clause builder 126, a join builder 128, and a query optimizer 130. The flow of the query may be, for example, WHERE, SELECT, ORDERBY, GROUPBY (WHERE yes again) and FROM.

The dataset request 72 is received by the ORDER BY clause builder 120 of the query builder 110. The ORDER BY clause builder 120 validates the columns in the dataset request 72 and searches for columns with Sort property assigned. A Sort property is the completion of an ORDER BY clause statement passed as a parameter by the system request. For each column that has values for the Sort property, the ORDER BY clause is concatenated, in a plain SQL format, using SQL delimiters: "["and"]". These delimiters are generally used because they are unique for each side of the delimitation and may be easily replaced with the data source delimiter. Of course, other delimiters may be used. For every column used, it's containing table is added a tables bucket 132. When added to the tables bucket 132, an alias is created for the table, generally using simple one, two or three characters. All columns are checked and the clause built and stored. If the column's table is already in the tables bucket 132, its already assigned alias is used to keep building the query.

After the ORDER BY clause builder 120, the WHERE clause builder 122 is invoked. The dataset request columns are scanned for columns with values assigned. Each group of values is translated to filters in the WHERE clause. Also, any column's table not in the table bucket 132 is added to the table bucket 132 and has an alias assigned. As the columns are scanned, the WHERE clause is completely built.

Once the WHERE clause is built, the SELECT clause builder 124 builds the SELECT clause in a similar manner. Tables are added to the table bucket 132 and all columns which are not set to not be selected are added to the query. Selected columns are returned in the system response while columns that are not selected may be utilized in the WHERE clause.

The join builder 128 takes all tables in the tables bucket 132 and evaluates all possible link paths to link the tables in the query. Several tables may be in the tables bucket 132 and the tables may be linked in several different ways. When multiple connection paths may be used to join various of the tables, the one used is determined by a number of factors. These factors include the number of records, the existence of indexes, data sources, etc. These factors are defined and weighted in the meta database 16 and are evaluated during every query generation process by the join builder 128. The join builder 128 chooses a link path, adds the tables which are not in the tables bucket 132 and sets a numeric property on each table in the table bucket 132 with the order in which the join should be made.

The FROM clause builder 126 builds the FROM clause of the query based on the tables bucket information. The query optimizer 130 takes the query clauses and replaces simple SQL clauses with syntax based on the provider and includes heterogenous query syntax based on the host server.

Example 2 shows an example final query:

EXAMPLE 2

```
SELECT
    [A].[FIRST_NAME],
    [A].[LAST_NAME],
    [B].[SALARY],
    [C].[CITY]
FROM
    [DATASOURCE1].[USER1].[CONTACTS] AS A,
JOIN
    OPENQUERY(DS2, 'SELECT SALARY, REC#
        FROM USER1.HRDATA') AS B
    ON (A.HR_ID = CAST(B.REC#, AS VARCHAR(10))
JOIN
```

```
OPENQUERY(DS3, 'SELECT CITYNAME, HR_ID
    FROM LIB.CITIES') AS C
ON (B.HR_ID = C.HR_ID)
VWHERB ([A].|FIRST_NAME]
    IN ('JOHN', 'ROBERT', 'JOEL', 'LISA')).
ORDER BY [A].[LAST_NAME] ASC
```

Figure 16:
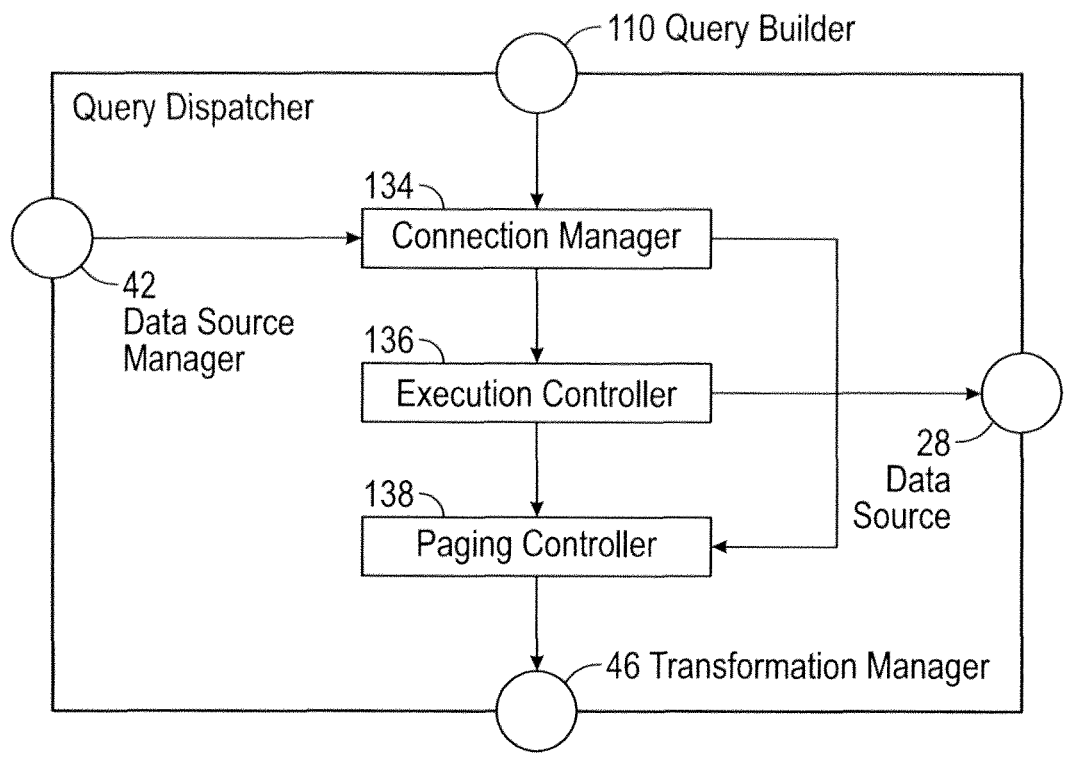
FIG. 16 illustrates a query dispatcher of a query manager in accordance with one embodiment.

A query dispatcher 112 of the query manager of FIG. 14 is shown in FIG. 16. The query dispatcher 112 takes the query built by the query builder 110 and executes it. The query dispatcher 112 may include a connection manager 134 for taking information from the data source manager 42 of FIG. 13 and connecting it to the underlying data source 28. The database connections may be shared to avoid the misuse of the servers' resources. The connection timeout is managed by the connection manager 134. Once connected to the data source 28, an execution controller 136 of the query dispatcher 112 may optionally generate execution threads to run the queries asynchronously such that the timeout settings are shared by the threads in the same pool, thereby avoiding fulfilling the total timeout for the request.

The query dispatcher 112 may further include a paging controller 138. A paging controller 138 may be desirable in a web application where pages with a preset number of records are illustrated separately. The paging controller 138 returns the page number and records as requested. The paging controller 138 may have its technique laid out in a repository such as the meta database 16 such that disparate paging techniques may be used depending on the environment and request. In many embodiments, a paging controller 138 is not provided.

Figure 17:
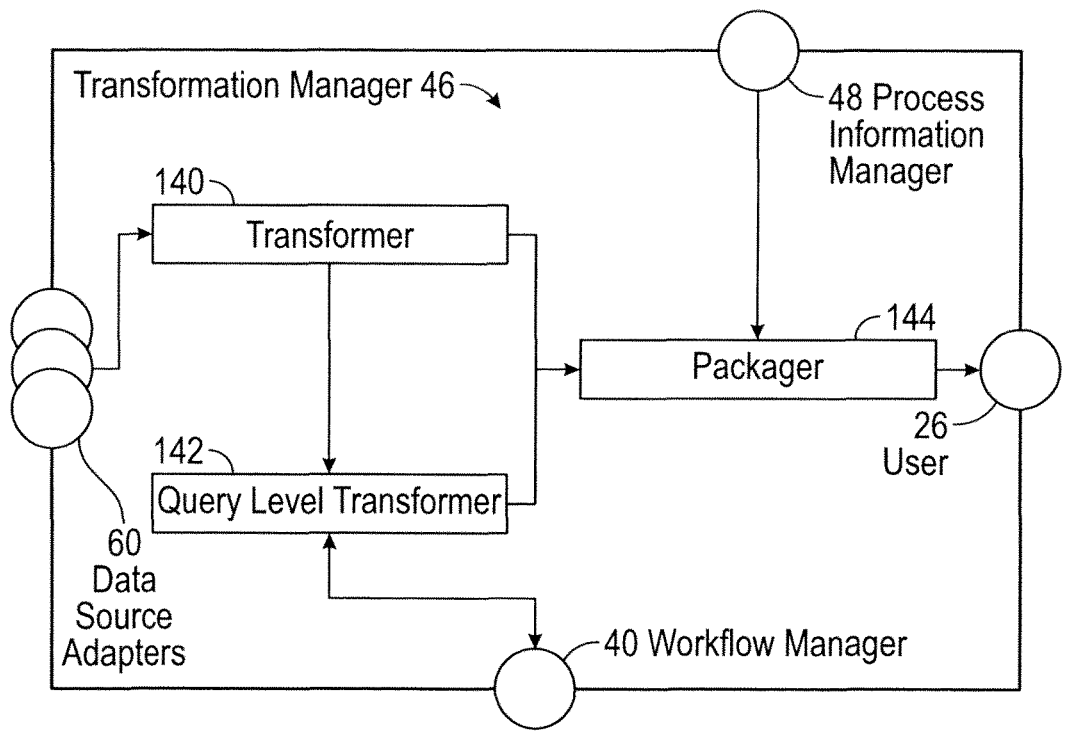
FIG. 17 illustrates a transformation manager of a processing component in accordance with one embodiment.

A transformation manager 46 of the processing component 24 is illustrated in FIG. 17. The transformation manager 46 shown comprises a transformer 140, a query level transformer 142, and a packager 144. The transformation manager 46 may have several types of transformation schemes, depending on the type of transformation. If the transformation is aesthetic, a transformer 140 may be used to do several transformations such as format, aggregate, clean, parse, conversions, etc. If the transformation is at the query level, such as selecting records by a non-standard date, transformations are performed by a query level transformer 142. The query level transformer 142 may be used to transform the user request's filters before the query is generated and then transform the results using the same techniques in the opposite direction. Other transformations, such as transforming a stream of bytes in a jpg image or a pdf file may be performed by a specialized transformer. After the transformations are done, a packager 144 of the transformation manager 46 may take information from the process information manager 48, merge with information about the execution of the queries and inject them in the resultant response and deliver it to the user 26.

Figure 18:
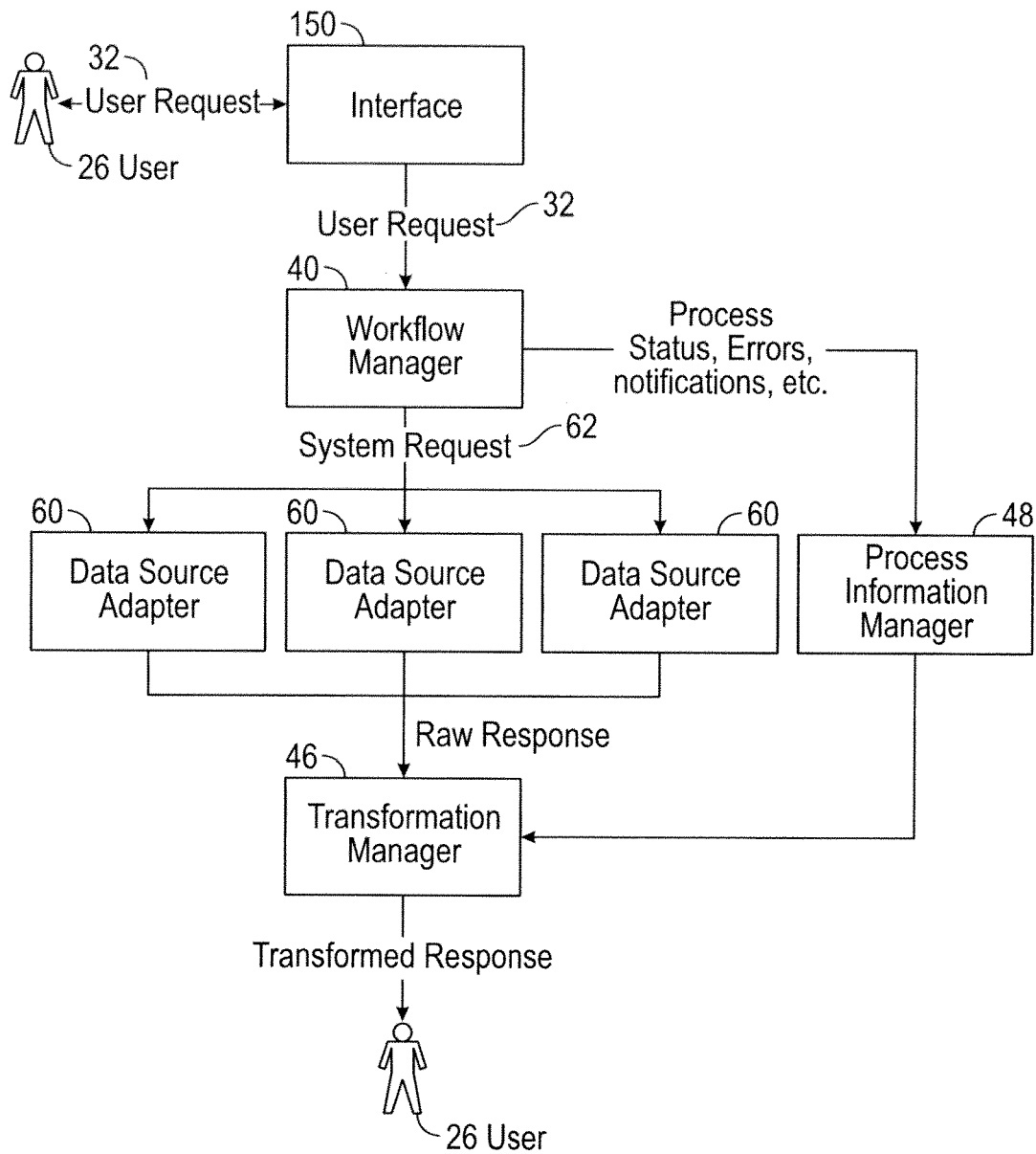
FIG. 18 illustrates a block diagram of a method of using the midware system in accordance with one embodiment.

The method of the midware system 10 of the present invention is shown in FIG. 18. As shown, a user 26 submits a user request 32 to the midware system 10 through a user interface 150. The user request 32 is sent to and received by the service component of the midware system 10. More specifically, the user request may be received by and processed by a workflow manager 40 of the midware system 10. As explained previously, the workflow manager 50 converts the user request 32 into a system request 62. The workflow manager 40 interacts with one or more adapters 60 and a transformation manager 46. The system request 62 may be further converted into one or more dataset requests 72. The one or more adapters 60 are used to communicate the dataset request 72 with one or more data sources 60.

Thus, the system request 62 is transmitted via the workflow manager 40 to one or more adapters 60 and queries are created to obtain data from underlying data sources 28. A raw response is provided by the adapters 60 in response to the user request 32. The transformation manager 46 performs transformations on the response—for example, converting dates to numbers, numbers to text, etc. The transformations may operate to display the response in a meaningful way. The transformed response 34 is transmitted to the user 26. Alternatively, a raw response may be transmitted to the user 26 or the response may be otherwise transformed.

Various other managers and components, as described previously, may be included in the midware system 10 of the present invention. Other means for performing various tasks herein described will be obvious to one skilled in the art and are within the scope of the invention. Further, while various tasks are herein described, not all of these tasks need to be performed.

In an example embodiment, the method and system of the present invention may be used to gather information regarding property. FIGS. 19-23 illustrate screen shots of such a request and the corresponding gathered and compiled information as well as the XML code for the request and the XML response to the request. While FIGS. 19-23 illustrate the request and response in XML format, other languages may be used for the request and the response.

Figure 19:
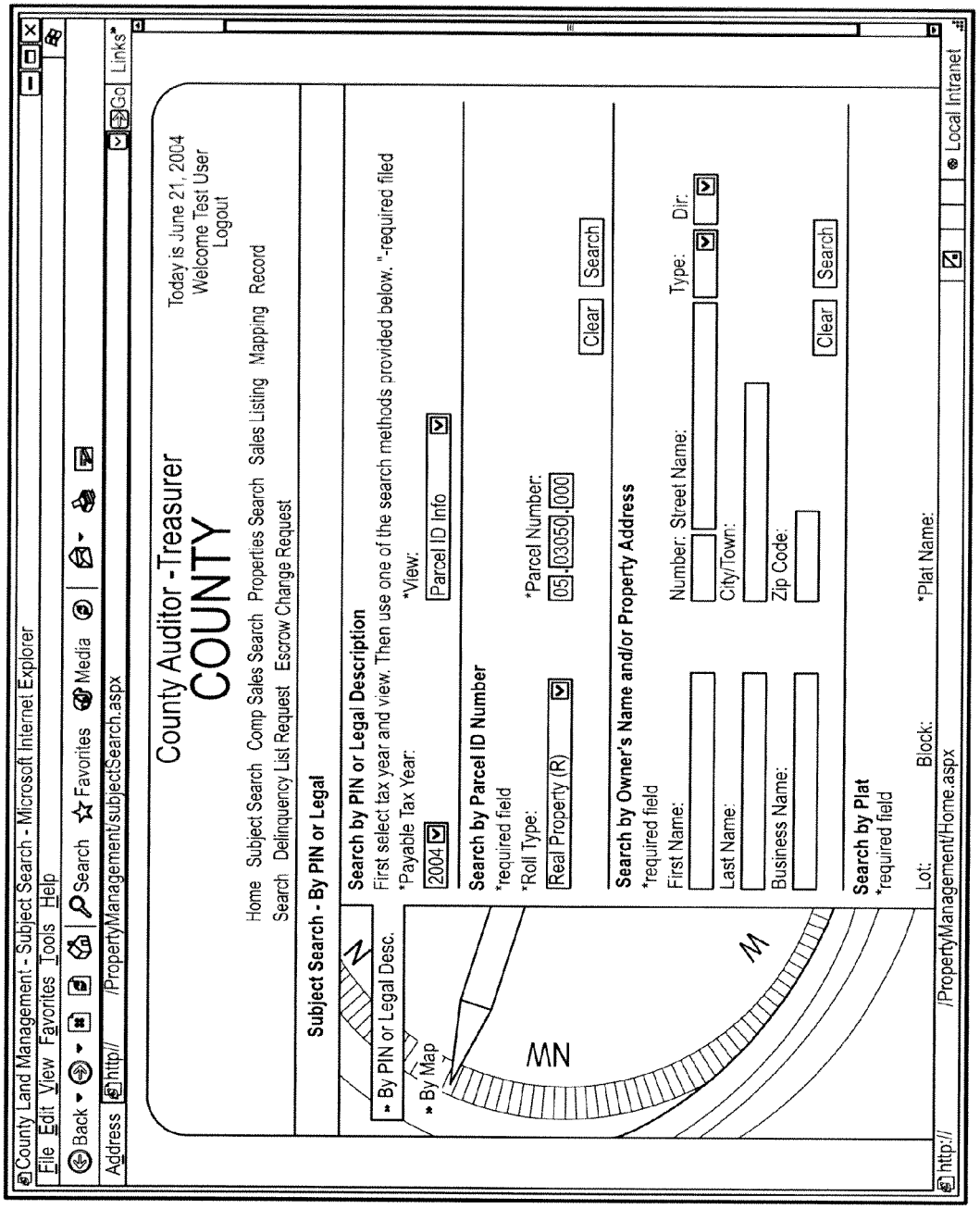
FIG. 19 illustrates a screen shot of an information request in accordance with one embodiment.

As shown in FIG. 19, the request may be searched by PIN or legal description, by parcel ID number, by owner's name and/or property address, or by plat. In the example, information is input regarding the payable tax year (2004), the view (Parcel ID Info), the roll type (Real Property (R)) and the parcel number (05.03050.000). FIG. 20 illustrates an XMI request generated from the screen shown in FIG. 19.

Figure 21:
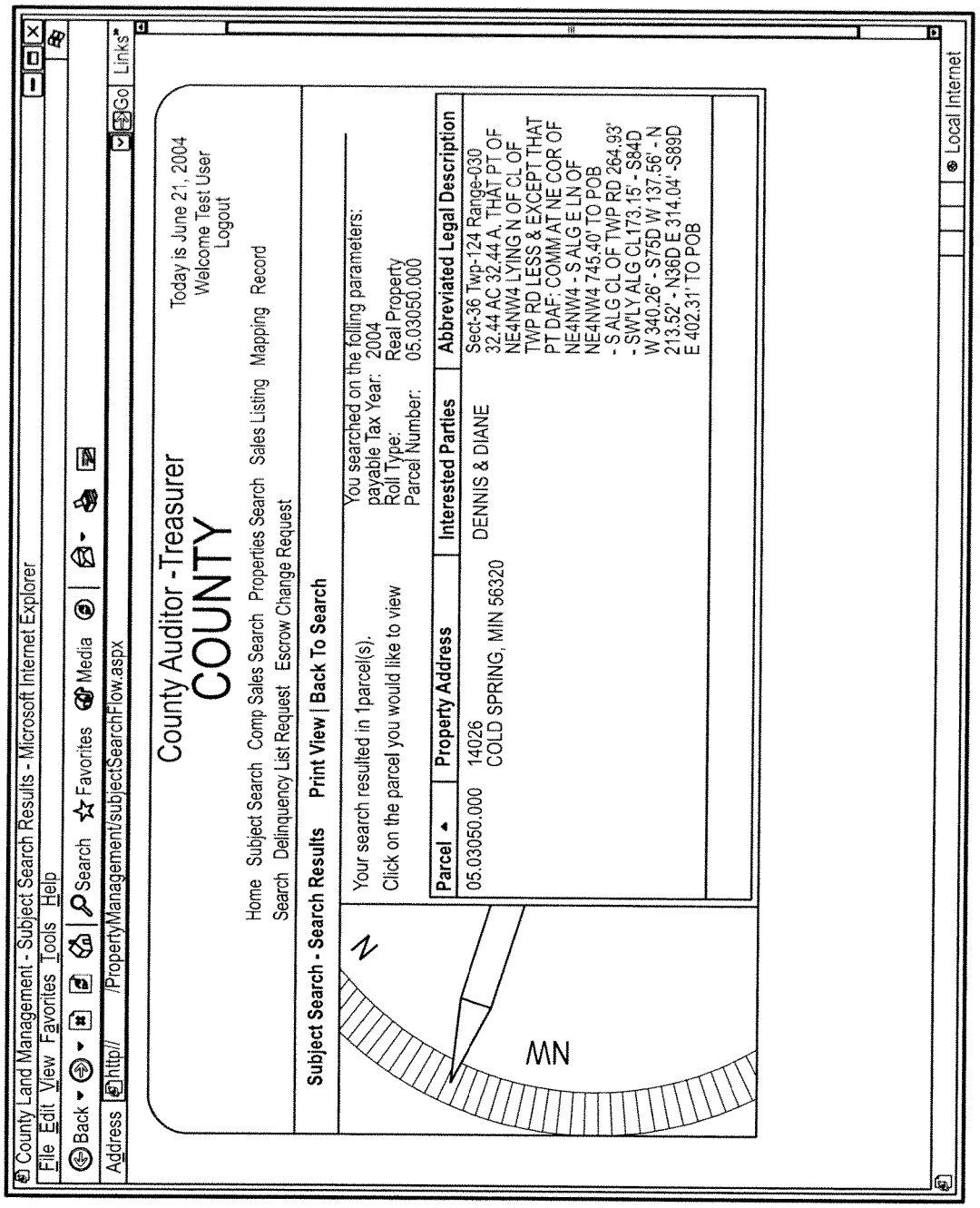
FIG. 21 illustrates a screen shot of a results parcel in accordance with one embodiment.

FIG. 21 illustrates a screen shot of the parcel results, including the parcel number, the property address, the interested parties, and the abbreviated legal description. FIG. 22 illustrates the XML results of the screen shown in FIG. 21.

Figure 23:
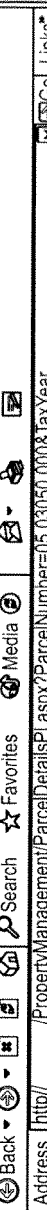
FIG. 23 illustrates the specifics regarding the results parcel of FIG. 20 in accordance with one embodiment.

FIG. 23 illustrates a screen shot of in depth information generated from the request of FIG. 19.

Although the present invention has been described with reference to preferred embodiments, persons skilled in the art will recognize that changes may be made in form and detail without departing from the spirit and scope of the invention.

What is claimed is:

1. A method for managing data, comprising:
   creating a metadata dataset comprising metadata of a plurality of disparate data sources, wherein the metadata of each of the plurality of disparate data sources describes data source information contained in the disparate data source, and wherein the metadata dataset comprises fields for each type of information to be queried;
   receiving a user request for information from the plurality of disparate data sources;
   in response to receiving the user request, for each of the plurality of disparate data sources, generating (i) a query based on a query language of the disparate data source and (ii) an API request to convey the query to the disparate data source, wherein generating the query is based on the user request, wherein the operation of generating the query and the API request for each of the plurality of disparate data sources comprises using the metadata dataset to correlate information requested in the user request with the disparate data source's information;

submitting each of the generated queries to its corresponding disparate data source using the corresponding API request;

receiving, in response to the generated queries, a raw data source response from each of the plurality of disparate data sources;

mapping, using the metadata dataset, a data source information field in each raw data source response to a formatted information field to transform each of the raw data source responses into a formatted data source response; and combining the formatted responses into a response to the user request.

2. The method of claim 1, wherein the plurality of disparate data sources comprises at least two different types of data sources from the group comprising databases, data files, web services, web pages, computer services, data streams, scanned documents, geographic data, GIS data.

3. The method of claim 1, wherein a graphical representation of the metadata dataset comprises a dataset tree, and wherein creating a metadata dataset comprises providing a graphical user interface to a user that allows the user to drag fields to a dataset on the dataset tree.

4. The method of claim 1, wherein transforming each of the raw data source responses comprises transforming each of the raw data source responses into hierarchical or tabular data.

5. The method of claim 1, wherein the step of generating the query and the API request comprises generating a web service request.

6. The method of claim 5, wherein combining the formatted responses into the response to the user request for information comprises using the metadata dataset to join information in each of the formatted responses into the response to the user request for information.

7. The method of claim 1, wherein the step of receiving the user request comprises receiving a SQL request based on the metadata dataset.

8. The method of claim 1, wherein the user request is a request to gather data from the plurality of disparate data sources.

9. The method of claim 1, further comprising:
receiving a second user request to write information to the plurality of disparate data sources;
for each of the plurality of disparate data sources, generating (i) a second query based on the query language of the disparate data source and (ii) an API request that conveys the second query to the disparate data source;
submitting each of the generated second queries to the corresponding disparate data sources through the API request; and
writing information to each of the disparate data sources based on the submitted second queries.

10. The method of claim 1, wherein creating a metadata dataset comprising metadata of the plurality of disparate data sources, comprises:
retrieving the metadata from the plurality of disparate data sources;
generating a list of fields from the retrieved metadata, wherein the fields correspond to data source information fields in the plurality of disparate data sources;
receiving a selection of one or more fields from the list of fields, thereby resulting in one or more selected fields; and
creating a metadata dataset comprising the one or more selected fields.

11. The method of claim 1, further comprising: storing the created metadata dataset in a metadata database, wherein the metadata database does not store data source information contained in the plurality of disparate data sources.

12. A computer program product comprising a non-transitory computer useable storage medium having computer program stored therein for enabling a computer system to perform the functions of:
creating a metadata dataset comprising metadata of a plurality of disparate data sources, wherein the metadata of each of the plurality of disparate data sources describes data source information contained in the disparate data source, and wherein the metadata dataset comprises fields for each type of information to be queried;
receiving a user request for information from the plurality of disparate data sources;
in response to receiving the user request, for each of the plurality of disparate data sources, generating (i) a query based on a query language of the disparate data source and (ii) an API request to convey the query to the disparate data source, wherein generating the query is based on the user request, wherein the function of generating the query and the API request for each of the plurality of disparate data sources comprises using the metadata dataset to correlate information requested in the user request with the disparate data source's information;
submitting each of the generated queries to its corresponding disparate data source using the corresponding API request;
receiving, in response to the generated queries, a raw data source response from each of the plurality of disparate data sources;
mapping, using the metadata dataset, a data source information field in each raw data source response to a formatted information field to transform each of the raw data source responses into a formatted data source response; and
combining the formatted responses into a response to the user request.

13. The computer program product of claim 12, wherein the plurality of disparate data sources comprises at least two different types of data sources from the group comprising databases, data files, web services, web pages, computer services, data streams, scanned documents, geographic data, GIS data.

14. The computer program product of claim 12, wherein a graphical representation of the metadata dataset comprises a dataset tree, and wherein creating a metadata dataset comprises providing a graphical user interface to a user that allows the user to drag fields to a dataset on the dataset tree.

15. The computer program product of claim 12, wherein transforming each of the raw data source responses comprises transforming each of the raw data source responses into hierarchical or tabular data.

16. The computer program product of claim 12, wherein the function of generating the query and the API request comprises generating a web service request.

17. The computer program product of claim 16, wherein combining the formatted responses into the response to the user request for information comprises using the metadata dataset to join information in each of the formatted responses into the response to the user request for information.

18. The computer program product of claim 12, wherein the function of receiving the user request comprises receiving a SQL request based on the metadata dataset.

19. The computer program product of claim 12, wherein the user request is a request to gather data from the plurality of disparate data sources.

20. The computer program product of claim 12, the computer program further configured to enable the computer system to perform the functions of:
  receiving a second user request to write information to the plurality of disparate data sources;
  for each of the plurality of disparate data sources, generating (i) a second query based on the query language of the disparate data source and (ii) a second API request that conveys the second query to the disparate data source;
  submitting each of the generated second queries to the corresponding disparate data sources through the second API request; and
  writing information to each of the plurality of disparate data sources based on the submitted second queries.

21. The computer program product of claim 12, wherein creating a metadata dataset comprising metadata of the plurality of disparate data sources, comprises:
  retrieving the metadata from the plurality of disparate data sources;
  generating a list of fields from the retrieved metadata, wherein the fields correspond to data source information fields in the plurality of disparate data sources;
  receiving a selection of one or more fields from the list of fields, thereby resulting in one or more selected fields; and
  creating a metadata dataset comprising the one or more selected fields.

* * * * *